United States Patent
McHale et al.

(10) Patent No.: US 6,169,788 B1
(45) Date of Patent: *Jan. 2, 2001

(54) COMMUNICATION SERVER APPARATUS HAVING DISTRIBUTED SWITCHING AND METHOD

(75) Inventors: John F. McHale, Austin; James R. Sisk, Cedar Park; Robert H. Locklear, Jr., Austin; Jason McCullough, Austin; Clifford L. Hall, Austin; Ronald E. Ham, Austin, all of TX (US)

(73) Assignee: Cisco Technology, Inc., San Jose, CA (US)

( * ) Notice: Under 35 U.S.C. 154(b), the term of this patent shall be extended for 0 days.

This patent is subject to a terminal disclaimer.

(21) Appl. No.: 09/183,113

(22) Filed: Oct. 30, 1998

Related U.S. Application Data

(63) Continuation of application No. 08/781,441, filed on Jan. 10, 1997, now Pat. No. 5,852,655, which is a continuation-in-part of application No. 08/625,769, filed on Mar. 29, 1996, now Pat. No. 5,668,857.

(51) Int. Cl.$^7$ .................................................. H04M 11/00

(52) U.S. Cl. ........................................ 379/93.14; 379/93.28

(58) Field of Search ........................ 379/93.28, 93.14, 379/93.05, 93.07, 93.01; 375/222

(56) References Cited

U.S. PATENT DOCUMENTS

| | | | |
|---|---|---|---|
| 3,532,827 | 10/1970 | Ewin | 179/18 |
| 3,821,484 | 6/1974 | Sternung et al. | 179/18 EB |
| 4,002,849 | 1/1977 | Kotler et al. | 179/18 EB |
| 4,282,408 | 8/1981 | Stauers | 179/18 FA |
| 4,665,514 | 5/1987 | Ching et al. | 370/60 |
| 4,782,512 | 11/1988 | Hutton | 379/98 |
| 5,119,403 | 6/1992 | Krishnan | 375/39 |
| 5,134,611 | 7/1992 | Steinka et al. | 370/79 |
| 5,185,763 | 2/1993 | Krishnan | 735/39 |
| 5,198,818 | 3/1993 | Samueli et al. | 341/144 |
| 5,202,884 | 4/1993 | Close et al. | 370/94.1 |

(List continued on next page.)

FOREIGN PATENT DOCUMENTS

| | | | |
|---|---|---|---|
| 6376648 | 4/1988 | (JP) | H04L/11/20 |

OTHER PUBLICATIONS

Horst Hessenmüller, et al., Zugangsnetzstrukturen für interaktive Videodienste (Teil 1), *Fernmelde Ingenieur*, Der, vol. 48, No. 8, XP000647017, Aug. 1994, Germany, pp. 1–32 (with English translation).

Horst Hessenmüller, et al., Zugangsnetzstrukturen für interaktive Videodienste (Teil 2), *Fernmelde–Ingeniuer*, vol. 48, No. 9, XP000619688, Sep. 1994, Germany, pp. 1–28 (with English translation).

*Primary Examiner*—Stella Woo
(74) *Attorney, Agent, or Firm*—Baker Botts L.L.P.

(57) ABSTRACT

A communication server includes a modem pool (652) that comprises a plurality of XDSL modems (660). The communication server also includes a plurality of line interface modules (650). Each line interface module (650) has a plurality of inputs each coupled to a twisted pair data line and has a plurality of outputs each coupled to one of the XDSL modems (660). Each line interface module (650) operates to detect a need for data service on a requesting twisted pair data line and to couple the requesting twisted pair data line to an output associated with a selected XDSL modem (660). A controller (653) is coupled to the XDSL modems (660) and to the plurality of line interface modules (650). The controller (653) operates to select one of the XDSL modems (660) in response to a detected need for data service. The controller (653) further operates to direct the line interface module (650) to which a requesting twisted pair data line is coupled to couple the requesting twisted pair data line to the output associated with the selected XDSL modem (660).

22 Claims, 11 Drawing Sheets

U.S. PATENT DOCUMENTS

| | | | |
|---|---|---|---|
| 5,210,530 | 5/1993 | Kammerer et al. | 340/825.08 |
| 5,214,650 | 5/1993 | Renner et al. | 370/110.1 |
| 5,222,077 | 6/1993 | Krishnan | 375/39 |
| 5,247,347 | 9/1993 | Litteral et al. | 358/85 |
| 5,282,155 | 1/1994 | Jones | 364/724.19 |
| 5,285,474 | 2/1994 | Chow et al. | 375/13 |
| 5,293,402 | 3/1994 | Crespo et al. | 735/14 |
| 5,295,159 | 3/1994 | Kerpez | 735/38 |
| 5,331,670 | 7/1994 | Sorbara et al. | 375/111 |
| 5,337,348 | 8/1994 | Yamazaki et al. | 379/94 |
| 5,339,355 | 8/1994 | Mori et al. | 379/94 |
| 5,341,474 | 8/1994 | Gelman et al. | 395/200 |
| 5,345,437 | 9/1994 | Ogawa | 370/13 |
| 5,367,540 | 11/1994 | Kakuishi et al. | 375/103 |
| 5,371,532 | 12/1994 | Gelman et al. | 348/7 |
| 5,400,322 | 3/1995 | Hunt et al. | 370/19 |
| 5,404,388 | 4/1995 | Eu | 379/24 |
| 5,408,260 | 4/1995 | Arnon | 348/6 |
| 5,408,522 | 4/1995 | Ikehata et al. | 379/98 |
| 5,408,527 | 4/1995 | Tsutsu | 379/211 |
| 5,408,614 | 4/1995 | Thornton et al. | 395/275 |
| 5,410,264 | 4/1995 | Lechleider | 327/311 |
| 5,410,343 | 4/1995 | Coddington et al. | 348/7 |
| 5,412,660 | 5/1995 | Chen et al. | 370/110.1 |
| 5,414,455 | 5/1995 | Hooper et al. | 348/7 |
| 5,414,733 | 5/1995 | Turner | 375/233 |
| 5,422,876 | 6/1995 | Turudic | 370/15 |
| 5,428,608 | 6/1995 | Freeman et al. | 370/60.1 |
| 5,440,335 | 8/1995 | Beveridge | 348/13 |
| 5,442,390 | 8/1995 | Hooper et al. | 348/7 |
| 5,452,306 | 9/1995 | Turudic et al. | 370/110.1 |
| 5,453,779 | 9/1995 | Dan et al. | 348/7 |
| 5,461,415 | 10/1995 | Wolf et al. | 348/7 |
| 5,461,616 | 10/1995 | Suzuki | 370/9 |
| 5,461,640 | 10/1995 | Gatherer | 375/231 |
| 5,469,495 | 11/1995 | Beveridge | 379/56 |
| 5,475,735 | 12/1995 | Williams et al. | 379/59 |
| 5,477,263 | 12/1995 | O'Callaghan et al. | 348/7 |
| 5,479,447 | 12/1995 | Chow et al. | 375/260 |
| 5,495,483 | 2/1996 | Grube et al. | 370/95.1 |
| 5,513,251 | 4/1996 | Rochkind et al. | 379/93 |
| 5,528,585 | 6/1996 | Cooley et al. | 370/56 |
| 5,546,379 | 8/1996 | Thaweethai et al. | 370/17 |
| 5,610,910 | 3/1997 | Focsaneanu et al. | 370/351 |
| 5,619,505 | 4/1997 | Grube et al. | 370/476 |
| 5,680,394 | 10/1997 | Bingham et al. | 370/294 |
| 5,751,701 | 5/1998 | Langberg et al. | 370/281 |
| 5,790,550 | 8/1998 | Peeters et al. | 370/480 |
| 5,822,374 | 10/1998 | Levin | 375/260 |
| 5,852,633 | 12/1998 | Levin et al. | 375/260 |
| 5,852,655 * | 12/1998 | McHale et al. | 379/93.14 |
| 5,909,463 | 6/1999 | Johnson et al. | 375/220 |
| 5,970,088 * | 12/1998 | Chen | 375/222 |
| 5,987,069 | 11/1999 | Furukawa et al. | 375/285 |
| 6,002,722 | 12/1999 | Wu | 375/295 |

\* cited by examiner

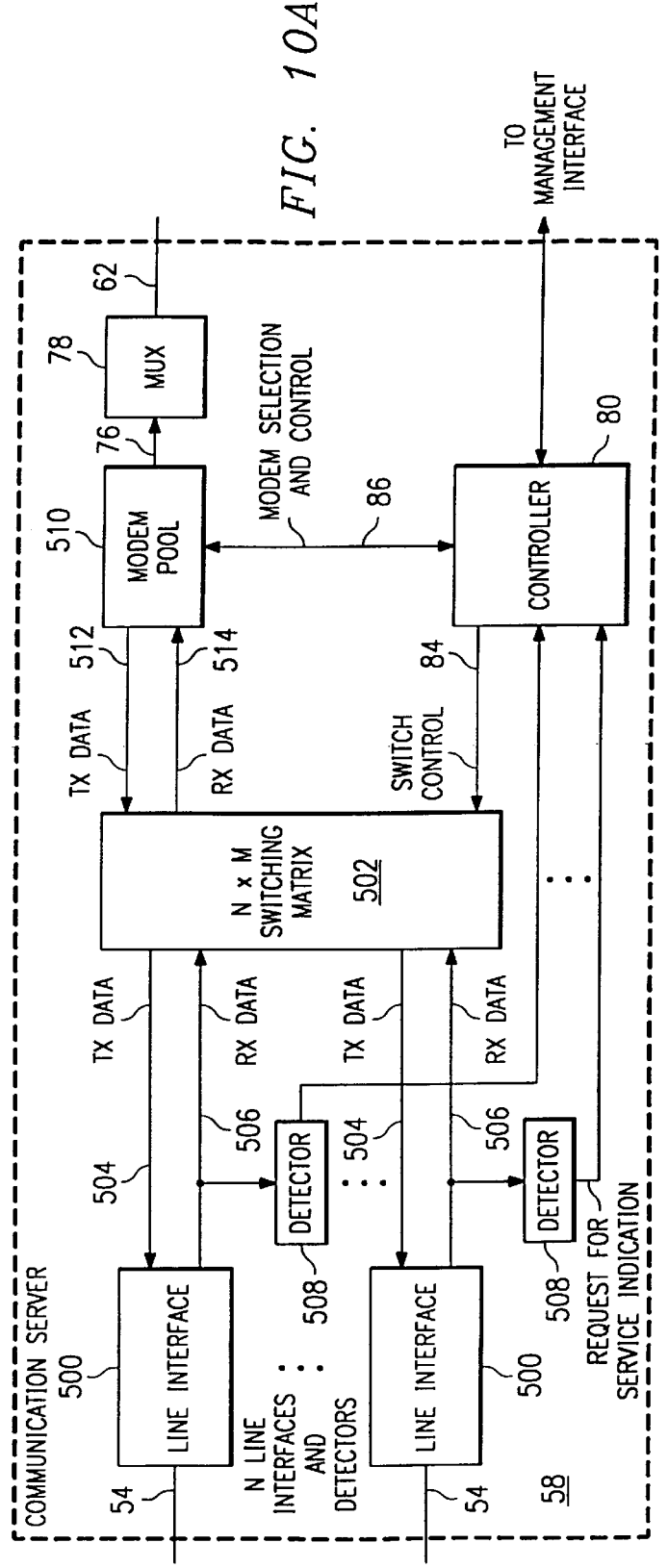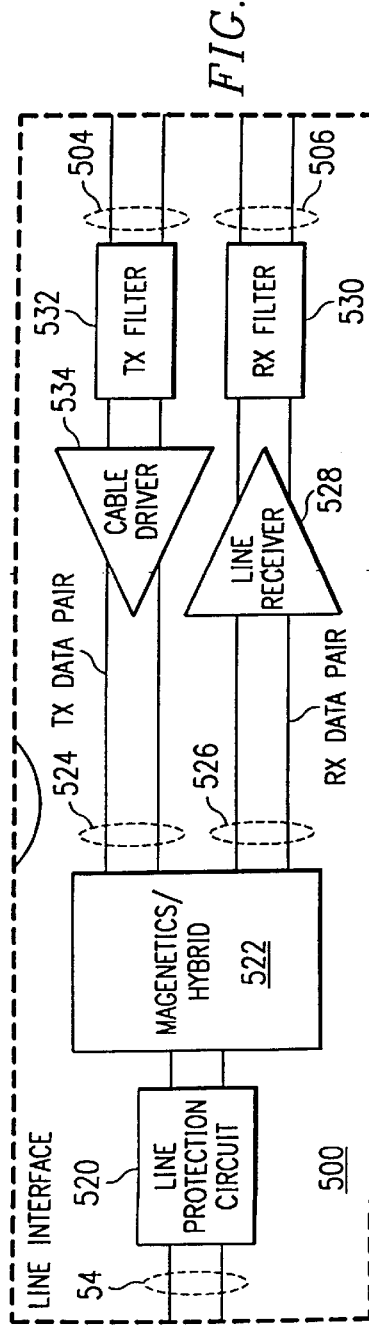

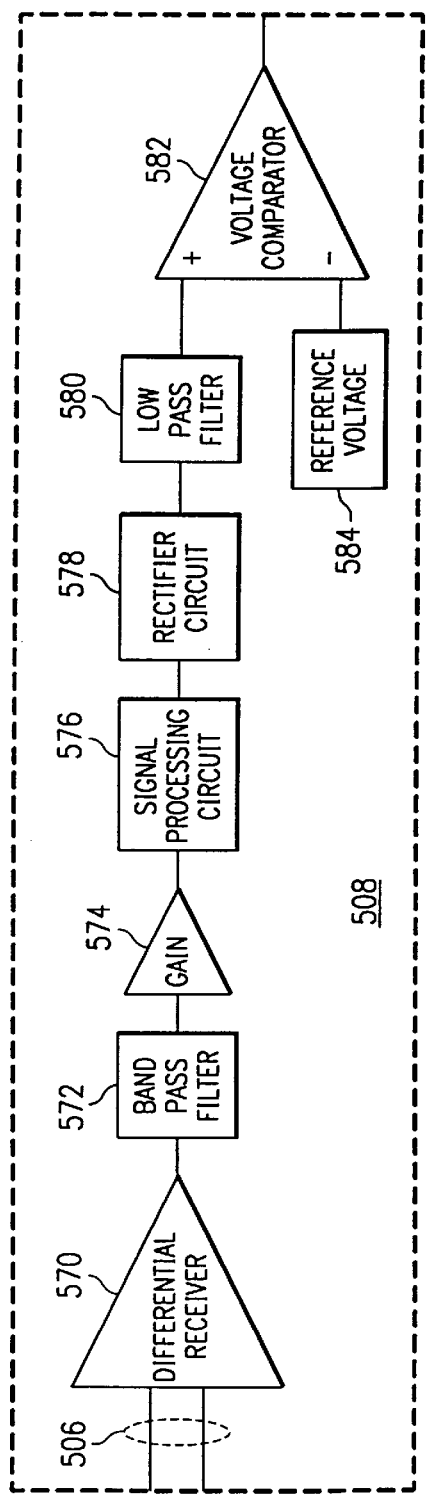
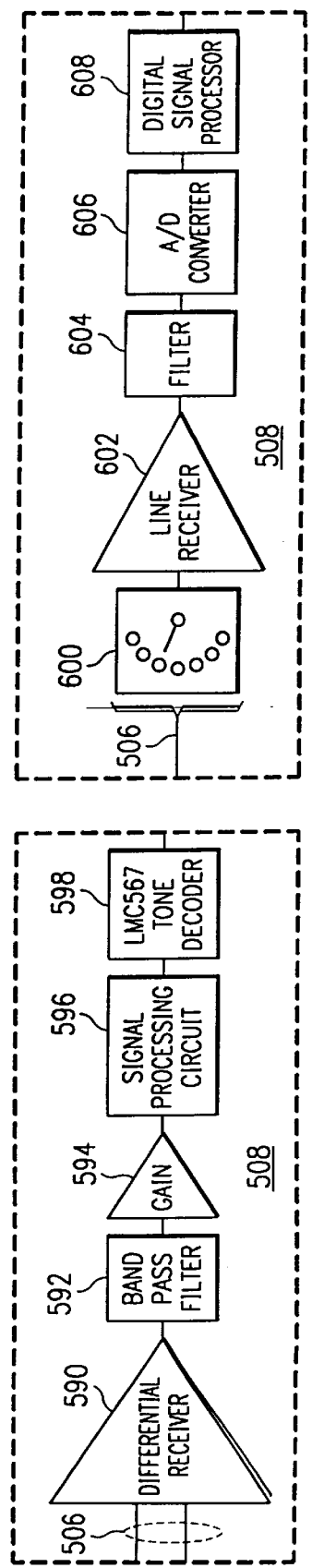
FIG. 11A
FIG. 11B
FIG. 11C

COMMUNICATION SERVER APPARATUS HAVING DISTRIBUTED SWITCHING AND METHOD

CROSS-REFERENCE TO RELATED APPLICATIONS

This application is a continuation of U.S. patent application Ser. No. 08/781,441, filed Jan. 10, 1997, now U.S. Pat. No. 5,852,655, which is a continuation-in-part of U.S. patent application Ser. No. 08/625,769, filed Mar. 29, 1996 by John F. McHale, and entitled "Communication Server Apparatus and Method," now U.S. Pat. No. 5,668,857.

This application is related to: U.S. patent application Ser. No. 08/781,444, filed Jan. 10, 1997, and entitled "Communication Server Apparatus Having Four-Wire Switching Interface and Method," now U.S. Pat. No. 6,014,431; U.S. patent application Ser. No. 08/781,450, filed Jan. 10, 1997, and entitled "Communication Server Apparatus Using Digital Signal Switching and Method," now U.S. Pat. No. 5,898,761; and U.S. patent application Ser. No. 08/781,482, filed Jan. 10, 1997, and entitled "Communication Server Apparatus Using Frequency Multiplexing and Method," now U.S. Pat. No. 5,781,617.

TECHNICAL FIELD OF THE INVENTION

This invention relates in general to data communication, and more particularly to a communication server apparatus having distributed switching and method.

BACKGROUND OF THE INVENTION

A communication server provides access to communication facilities. For example, a communication server having a bank of modems may provide subscriber access to the modems for data communication. A communication server may be associated with its own dedicated communication network, or with an existing communication network, such as the public switched telephone network (PSTN).

As communication networks provide greater connectivity and access to information, there is an increasing demand for data communication at higher rates. One solution to provide increased data rates replaces existing twisted pair wiring with high bandwidth media, such as coaxial cables or fiber optic links. Other solutions adopt improved communication techniques using the existing hardware infrastructure. For example, digital subscriber line (XDSL) technology provides higher bandwidth data service over existing twisted pair wiring.

To deliver data service to the subscriber, a communication server may provide a dedicated or permanent connection to its communication facilities. For example, an existing communication server at a central office provides enough communication facilities to simultaneously service all PSTN subscribers. However, all telephone subscribers may not desire data service. Furthermore, the subscribers that desire data service may not simultaneously access the communication server.

SUMMARY OF THE INVENTION

In accordance with the present invention, the disadvantages and problems associated with communication servers have been substantially reduced or eliminated. In particular, a communication server apparatus having distributed switching and method are disclosed that provide data service to a number of subscribers using a reduced number of XDSL communication facilities.

According to one aspect of the present invention, a communication server includes a modem pool that comprises a plurality of XDSL modems. The communication server also includes a plurality of line interface modules. Each line interface module has a plurality of inputs each coupled to a twisted pair data line and has a plurality of outputs each coupled to one of the XDSL modems. Each line interface module operates to detect a need for data service on a requesting twisted pair data line and to couple the requesting twisted pair data line to an output associated with a selected XDSL modem. A controller is coupled to the XDSL modems and to the plurality of line interface modules. The controller operates to select one of the XDSL modems in response to a detected need for data service. The controller further operates to direct the line interface module to which a requesting twisted pair data line is coupled to couple the requesting twisted pair data line to the output associated with the selected XDSL modem.

Important technical advantages of the present invention include a communication server that provides data service to a number of subscribers using a reduced number of XDSL communication facilities. Over-subscription of data service is accomplished by selectively coupling a number of twisted pair data lines to a reduced number of XDSL modems. A controller polls the data lines in succession to determine which subscribers of the communication system need data service. Upon detecting a need for data service on a selected data line, the controller directs a switch to couple the selected data line to an available modem. The communication server may then provide data service suitable for high bandwidth applications, such as video-on-demand, multimedia, or Internet access.

Another important technical advantage of the present invention includes a communication server that provides over-subscribed XDSL data service using the existing infrastructure of the public switched telephone network (PSTN). Asymmetric digital subscriber line (ADSL), symmetric digital subscriber line (SDSL), high-speed digital subscriber line (HDSL), very high-speed digital subscriber line (VDSL), or other suitable XDSL technology can provide higher bandwidth data service over existing twisted pair wiring. These technologies may support data service simultaneously with traditional telephone service using a separation technique, such as frequency division multiplexing. In one embodiment, a splitter divides each incoming twisted pair subscriber line into a twisted pair phone line and a twisted pair data line. The phone line is coupled to a telephone switch to provide telephone service and the data line is coupled to the communication server to provide over-subscribed XDSL data service. The communication server and splitter may be located at a central office of the PSTN.

Another important technical advantage of the present invention includes the management and monitoring of XDSL data service provided to subscribers. To accomplish this, the communication server maintains an activity table to determine status information on twisted pair data lines and XDSL modems. In addition, the communication server can track subscriber usage, monitor subscriber information and generate billing and demographic information. In a particular embodiment, an activity detector disconnects a subscriber after a predetermined period of inactivity to release a modem for use by another subscriber.

An important technical advantage of the present invention is the distribution of the switching function to allow scalability of the number of supported data lines and over-subscription of XDSL modems.

A further important technical advantage of the present invention includes isolating the switch from the data lines and subscriber lines. The switch can thereby operate without constraints imposed by technical requirements for interaction with the data lines and subscriber lines. For example, isolation of the switching matrix allows CMOS switches to be used rather than more expensive solid state relays or mechanical relays.

Yet another important technical advantage of the present invention includes the ability to provide a two-wire isolated interface that can use a single switch to couple a data line to a specific modem. The present invention thus allows one switch per modem per data line configuration. The isolation system of the present invention can transform the data line impedance to an intermediate impedance in order to increase system performance. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which:

FIG. 9 is a flow chart of a method to decouple a data line from a modem in the communication server;

FIG. 10A illustrates another implementation of the communication server;

FIG. 10B illustrates in more detail a line interface device of the communication server of FIG. 10A;

FIG. 11A illustrates in more detail an analog filter implementation of a detector of the communication server;

FIG. 11B illustrates in more detail a tone decoder implementation of a detector of the communication server;

FIG. 11C illustrates in more detail a digital signal processor implementation of a detector of the communication server;

DETAILED DESCRIPTION OF THE INVENTION

Figure 1:
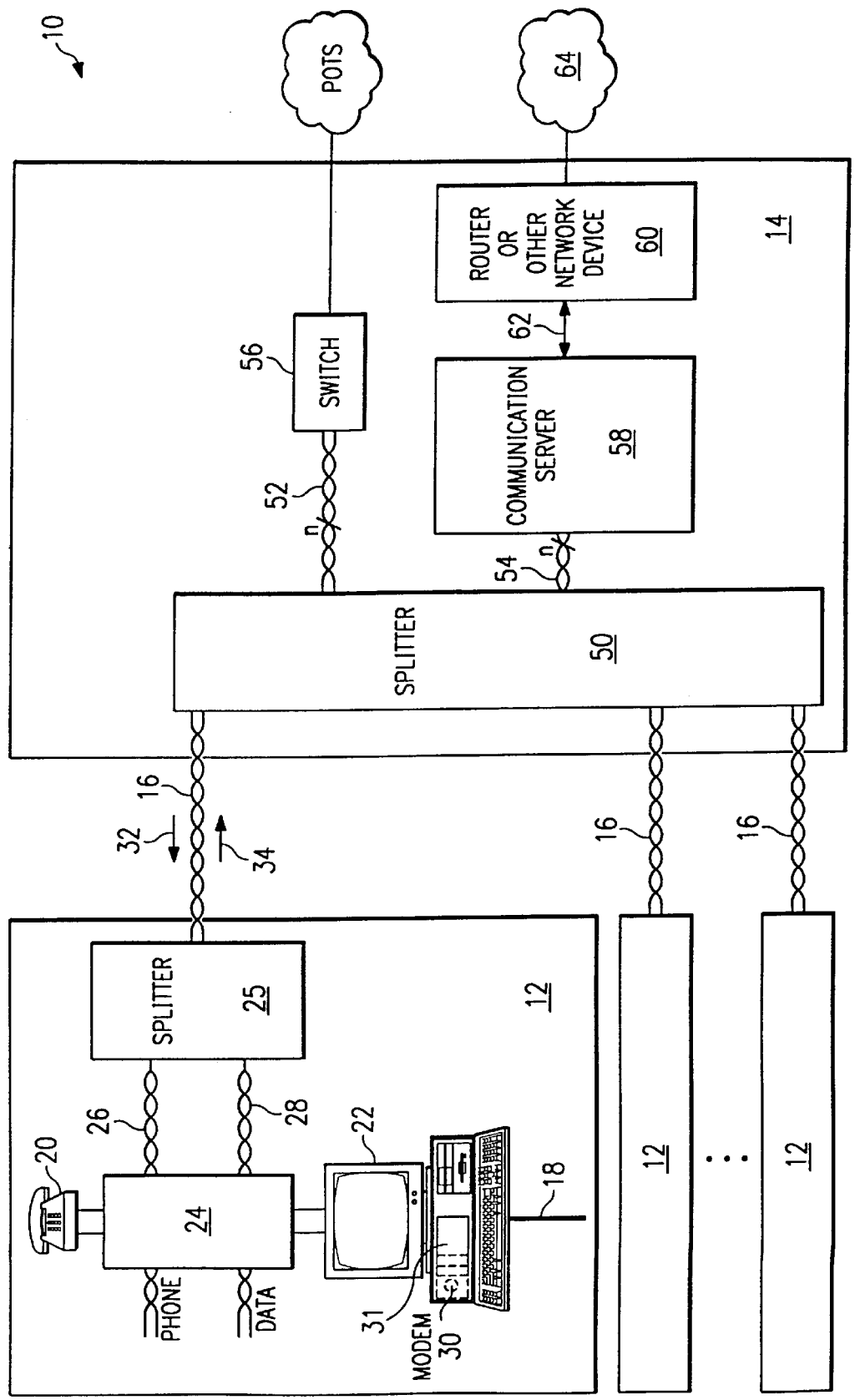
FIG. 1 illustrates a communication system that provides telephone and data service.

FIG. 1 illustrates a communication system 10 that provides both telephone and data service to a subscriber 12. A central office 14 is coupled to subscriber 12 using subscriber line 16. In operation, central office 14 provides telephone and data service to subscriber 12 using subscriber line 16. Subscriber line 16 supports simultaneous telephone and data service using twisted pair wiring.

Subscriber 12 includes a telephone 20 and a computer 22, both coupled to an interface 24. A splitter 25 is coupled to subscriber line 16 and operates to split subscriber line 16 into a twisted pair phone line 26 and a twisted pair data line 28. Phone line 26 is coupled to telephone 20 using interface 24. Similarly, data line 28 is coupled to computer 22 using interface 24. Subscriber 12 refers to one or more components at the subscriber premises shown in FIG. 1, as well as the user of these components.

Telephone 20 is a traditional telephone transceiver, a cordless telephone transceiver, or any other device suitable for allowing communication over telephone line 26. Computer 22 comprises a mainframe device, mini-frame device, server, desktop personal computer, notebook personal computer, or other suitable computing device having an XDSL modem 30 that communicates data using data line 28. Modem 30 couples to other components of computer 22 using a Peripheral Component Interconnect (PCI) bus, an Industrial Standard Architecture (ISA) bus, a Personal Computer Memory Card International Association (PCMCIA) interface, or any other suitable technology that provides input/output capability to computer 22. The selection and design of modem 30 for computer 22 may depend on the type or functionality of computer 22, as well as the data service rate supported by data line 28.

Modem 30 transmits and receives data in communication system 10 using any suitable digital subscriber line technology, referred to generally as XDSL. Modem 30 also supports Ethernet, Fast Ethernet, V.35 data protocol, frame relay, asynchronous transfer mode (ATM), switched multi-megabit data service (SMDS), high-level data link control (HDLC), serial line Internet protocol (SLIP), point-to-point protocol (PPP), transmission control protocol/Internet protocol (TCP/IP), or any other appropriate protocol, collectively referred to as digital protocol. For example, computer 22 may include a network interface 31 to receive data from central office 14 or to further communicate data to a local area network (LAN), wide area network (WAN), or other suitable network coupled to computer 22 using link 18. In general, modem 30 translates information between the communication protocol supported by communication system 10 and the digital protocol supported by computer 22.

Communication system 10 includes numerous other twisted pair subscriber lines 16 coupled to other subscribers 12. In an exemplary embodiment, central office 14 provides phone and data service to one thousand subscribers, with each subscriber 12 including one or more components described above at its premises. The subscribers and subscriber lines in communication system 10 are referred to collectively in the plural as subscribers 12 and subscriber lines 16.

Interface 24 couples phone line 26 to telephone 20, and data line 28 to computer 22. In one embodiment, interface 24 provides additional couplings to additional telephones 20 and computers 22 at subscriber 12. Splitter 25 is a passive or active splitter that divides subscriber line 16 into phone line 26 and data line 28 of the same type. Throughout this description, phone line 26 and data line 28 may be referred to specifically, or collectively as part of subscriber line 16.

Subscriber line 16 couples subscriber 12 to central office 14. Subscriber line 16 comprises twisted pair wiring that is commonly installed at subscriber premises and as the local loop in many public switched telephone networks (PSTNs). Subscriber line 16 may be unshielded twisted pair (UTP), shielded twisted pair (STP), or other suitable type or category of twisted pair wiring made of copper or other suitable material. Phone line 26 and data line 28 associated with subscriber line 16 may be the same or different type or category of twisted pair wiring.

Central office 14 includes a splitter 50 coupled to subscriber line 16. Like splitter 25 at subscriber 12, splitter 50 at central office 14 is a passive or active splitter that divides subscriber line 16 into a twisted pair phone line 52 and a twisted pair data line 54. Phone line 52 and data line 54 associated with subscriber line 16 may be the same or different type or category of twisted pair wiring. A telephone switch 56 at central office 14 is coupled to phone line 52 to provide plain old telephone system (POTS) service to subscriber 12. Telephone switch 56 also represents other components in the PSTN or other suitable voice communication network, such as switches, wireline or wireless links, satellites, microwave uplinks, and other communication facilities to deliver telephone service to subscriber 12.

A communication server 58 is coupled to splitter 50 using data line 54. As described in detail below, communication server 58 manages the provisioning of data service to subscriber 12. Communication server 58 performs off-hook detection to determine if subscriber 12 desires data service. Specifically, communication server 58 couples a modem to subscriber line 16 upon detecting a need for data service from computer 22. Communication server 58 tracks subscriber usage, monitors subscriber information, and generates billing and demographic information, as described below.

The data off-hook detector in communication server 58 can use one of several methods to determine whether subscriber 12 should be connected to an XDSL modem. The off-hook detector may monitor direct current voltages, electrical tones, data link frames, or any other protocol or data sequencing to determine whether subscriber 12 needs data access. The off-hook detector in communication server 58 may monitor electrical tones generated by modem 30 while in the process of training, notching, equalizing, or performing any other task that puts electrical tones onto subscriber line 16 and its associated data line 54. Communication server 58 may also detect frames or packets. These frames or packets could be Ethernet, ATM, HDLC, or any suitable data communications frame format. The off-hook detector in communication server 58 could also examine various protocols such as TCP/IP, PPP, or any other suitable network protocol or data stream.

Communications server 58 multiplexes modem digital outputs into a multiplexed digital line 62 for delivery to a router or other network device 60. In one embodiment, multiplexed digital line 62 carries a single bidirectional and multiplexed signal for all subscribers 12 in communication system 10. Signals on multiplexed digital line 62 may support any appropriate digital protocol used by network device 60. A communication network 64, such as a global communication network like the Internet, is coupled to network device 60. Communication network 64 may also include a synchronous optical network (SONET), a frame relay network, an asynchronous transfer mode (ATM) network, a T1, T3, E1, or E3 network, or any other suitable communication network.

One important technical advantage of the present invention is the ability to over-subscribe the XDSL communication facilities of communication server 58 to service an increasing number of subscribers 12 in communication system 10. Communication server 58 may couple to the same number and type of data lines 54 as represented by subscriber lines 16 in communication system 10. For example, if central office 14 services one thousand subscribers 12 using twisted pair subscriber lines 16, then data lines 54 coupled to communication server 58 may represent as many as one thousand twisted pair lines.

In one embodiment, not all subscribers 12 in communication system 10 desire access to data service provided by communication server 58. Splitter 50 need not provide a separate data line 54 for those subscribers 12 that only desire phone service from telephone switch 56. As more subscribers 12 desire access to data service, the XDSL communication capabilities of splitter 50 and communication server 58 may be supplemented in a modular and cost effective manner to meet the demand.

Communication system 10 supports data service over subscriber lines 16 using asymmetric digital subscriber line (ADSL), symmetric digital subscriber line (SDSL), high-speed digital subscriber line (HDSL), very high-speed digital subscriber line (VDSL), or any other suitable technology that allows high rate data service over twisted pair wiring. All of these technologies are referred to collectively as XDSL or communication protocol. In one embodiment, subscriber line 16 and components of subscriber 12 and central office 14 support communication using ADSL techniques that comply with ANSI standard T1.413. In another embodiment, ADSL communication over subscriber line 16 may be performed using the carrier-less amplitude phase modulation (CAP) technique developed by AT&T Corporation.

In an ADSL communication system, the downlink data rate 32 from central office 14 to subscriber 12 is greater than the uplink data rate 34 from subscriber 12 to central office 14. This allows high bandwidth communication to subscriber 12, while still providing lower bandwidth communication to central office 14. ADSL communication is well-adapted for applications, such as video-on-demand, multimedia, and Internet access, that transfer large volumes of information to subscriber 12 in response to shorter requests for information. In one specific embodiment, downlink data rate 32 is approximately 1.5 Mbps, whereas uplink data rate 34 is approximately 750 kbps. In other embodiments, downlink data rate 32 may be six Mbps or more depending on the specific XDSL technology employed, the quality and length of subscriber line 16, and the contribution of noise and distortion from other components in communication system 10.

XDSL technology provides data service using existing subscriber lines 16 without interrupting normal telephone service. This is accomplished by a separation technique, such as frequency division multiplexing (FDM), to separate frequencies that provide telephone service from those frequencies that provide data service. Dynamic noise cancellation techniques and a guard band between the data and phone service frequencies ensure reliable and simultaneous access to data and phone service over subscriber line 16. For example, subscriber 12 may simultaneously engage in both a data communication session using computer 22 and a voice conversation using telephone 20.

In operation, communication system 10 provides phone and data service to subscriber 12. Subscriber 12 accesses phone service by using telephone 20 to initiate a call. Upon going off-hook, communication system 10 establishes a circuit between telephone 20 and telephone switch 56 using interface 24, phone line 26, splitter 25, subscriber line 16, splitter 50, and one of phone lines 52. Upon establishing this telephone circuit, subscriber 12 using telephone 20 receives POTS service from telephone switch 56.

To access data service, subscriber 12 turns on computer 22, executes a program, such as an Internet browser, or performs some other affirmative or passive activity that generates a request, command, data packet, electrical tone, or other suitable information or signal that indicates a need for data service. In one embodiment, modem 30 repetitively transmits the need for data service in a request interval, where the request interval comprises the time length of the request and the silent interval until the next request. Alternatively, the need for data service indicated at subscriber 12 may be based on the establishment of a closed circuit between subscriber 12 and central office 14 or on one or more analog or digital signal transitions. Modem 30 communicates the need to communication server 58 at central office 14 using interface 24, data line 28, splitter 25, subscriber line 16, splitter 50, and one of data lines 54.

As described in detail below, communication server 58 detects the need for data service and selects an XDSL modem at communication server 58 to communicate with XDSL modem 30 in computer 22. Upon establishing a modem connection between modem 30 in computer 22 and a selected modem in communication server 58, subscriber 12 engages in a data communication session with communication network 64 using network device 60. In addition, computer 22 may function as a gateway into communication network 10 for other devices coupled to network interface 31 using link 18.

XDSL technology allows simultaneous use of subscriber line 16 for both phone and data service using the existing twisted pair wiring in communication system 10. In one embodiment, splitter 50, communication server 58, and network device 60 are located at central office 14 to provide an efficient and modular provisioning of XDSL data service to subscribers 12. However, splitter 50, communication server 58, and network device 60 may be located outside central office 14 without departing from the scope of the present invention.

Figure 2:
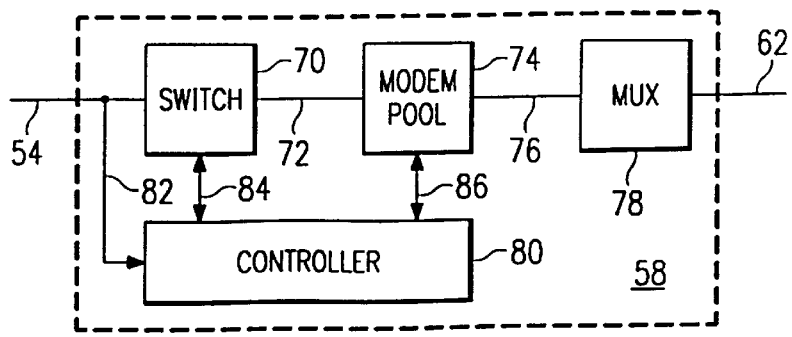
FIG. 2 illustrates a communication server in the communication system.

FIG. 2 illustrates in more detail communication server 58. Data lines 54 associated with subscriber lines 16 are coupled to a switch 70. In one embodiment, each data line 54 corresponds to an associated subscriber line 16 and its related subscriber 12. Switch 70 couples selected data lines 54 to output lines 72 that in turn couple to modem pool 74. The format of signals on data lines 54 and output lines 72 is the same as the format of signals on subscriber lines 16. For example, if communication system 10 adopts XDSL technology, signals on data lines 54 and output lines 72 are modulated using XDSL techniques.

Modems in modem pool 74 convert signals in an appropriate XDSL communication protocol into digital data in an appropriate digital protocol on digital lines 76. A multiplexer 78 is coupled to digital lines 76 and combines the signals on digital lines 76 into a fewer number of multiplexed digital lines 62. In one embodiment, multiplexer 78 combines information for delivery to network device 60 using a single multiplexed digital line 62.

A controller 80 is coupled to data lines 54 using a link 82. Controller 80 is also coupled to switch 70 and modem pool 74 using links 84 and 86, respectively. Controller 80 detects a need for data service generated by subscribers 12 and communicated over subscriber lines 16 to data lines 54. In response, controller 80 using link 84 directs switch 70 to couple a selected subset of data lines 54 to selected output lines 72 that couple to modems in modem pool 74. For example, controller 80 may monitor one thousand data lines 54 to provide XDSL data services using one hundred modems in modem pool 74.

Controller 80 also receives information from modem pool 74 using link 86 to determine status information of modems in modem pool 74. As digital lines 76 become inactive for a predetermined period of time, modem pool 74 detects this inactivity and generates a timeout indication for communication to controller 80. Upon receiving the timeout indication, controller 80 releases the inactive modem in modem pool 74 for later use.

In operation, communication server 58 detects a need for data service on a selected data line 54. This need may be indicated by current voltages, electrical tones, data link frames, packets, or any other suitable analog or digital protocol or data sequencing. Controller 80 detects the need using link 82 and configures switch 70 to provide a coupling between the selected data line 54 and one of the output lines 72 coupled to a selected modem pool 74. The selected modem translates bidirectional communication between a communication protocol on output line 72 and a digital protocol on digital line 76. Multiplexer 78 translates information between digital lines 76 and one or more multiplexed digital lines 62.

Figure 3:
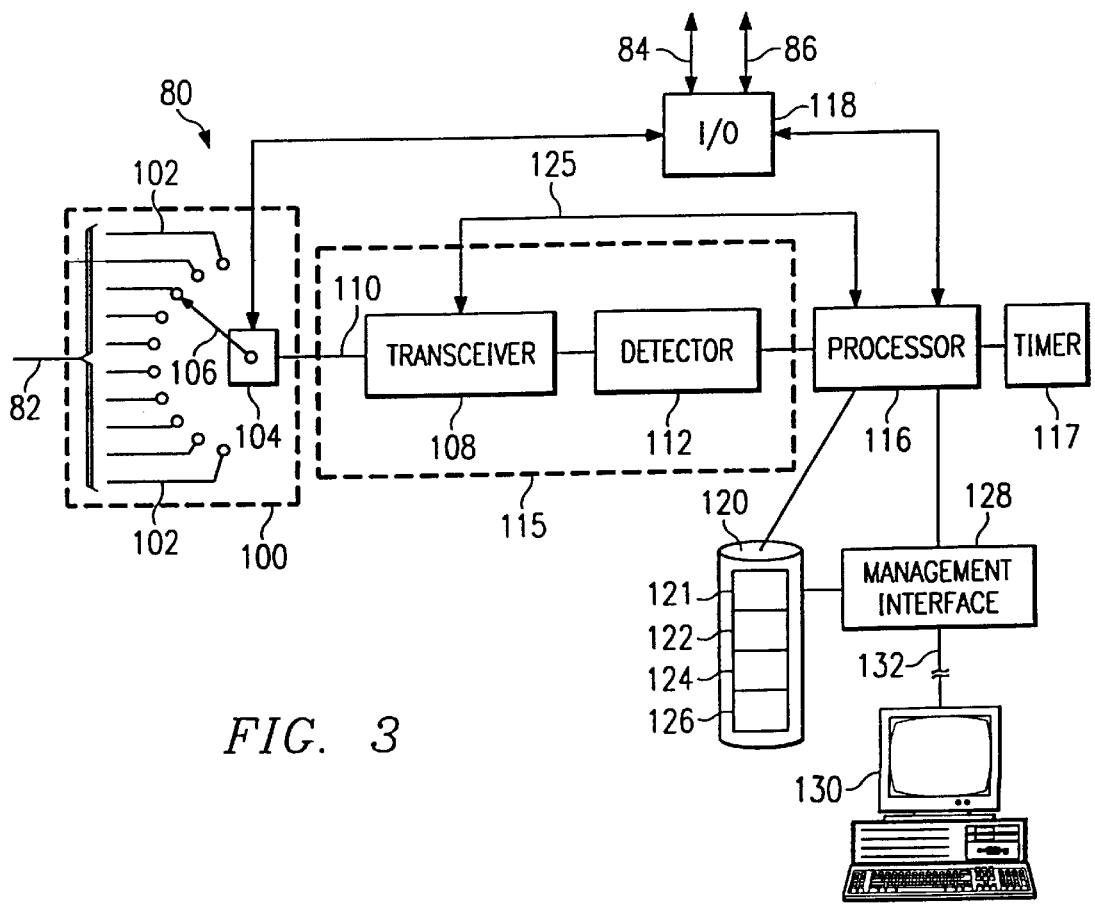
FIG. 3 illustrates in more detail the controller of the communication server.

FIG. 3 illustrates in more detail controller 80. Data lines 54 through link 82 are coupled to polling circuitry 100. In one embodiment, polling circuitry 100 includes a number of terminals 102 corresponding to each data line 54. A switch 104 having a conductive probe 106 contacts terminals 102 to sample the signal on the associated data line 54. Polling circuitry 100 may comprise electromagnetic components, such as a relay or switch, solid state circuitry, or both. It should be understood that the present invention embodies any polling circuitry 100 that allows successive or selective sampling of data lines 54.

Transceiver 108 receives a selected signal 110 from polling circuitry 100. A detector 112 is coupled to transceiver 108, which in turn is coupled to processor 116. Detector 112 may include a media access controller (MAC) and associated memory to detect and store frames or packets of an appropriate digital protocol. Detector 112 may also include less complicated circuitry to detect current voltages, electrical tones, data bit transmissions, or other analog or digital information generated by transceiver 108.

Transceiver 108 and detector 112 may collectively be represented as modem 115, as indicated by the dashed line. Modem 115 provides an interface between the XDSL communication protocol of communication system 10 and processor 116. Modem 115 also includes similar components and performs similar functions as modem 30 in computer 22 to enable modem 30 and modem 115 to exchange information using XDSL technology. Throughout this discussion, the term detector may refer to detector 112 or collectively modem 115.

A processor 116 is coupled to detector 112 and controls the overall operation of controller 80. A timer 117 is coupled to processor 116. Processor 116 is coupled to input/output circuitry 118, which in turn is coupled to switch 70 and modem pool 74 using links 84 and 86, respectively. Processor 116 is also coupled to switch 104 of polling circuitry 100 using input/output circuitry 118. In one embodiment, processor 116 controls the data line selection, dwell time, and other suitable parameters of polling circuitry 100.

Processor 116 is also coupled to database 120 that includes a program 121, an activity table 122, a line profile table 124, and a subscriber table 126. Database 120 stores information as one or more tables, files, or other data structure in volatile or nonvolatile memory. All or a portion of database 120 may reside at controller 80, within communication server 58, within central office 14, or at another location in communication system 10. For example, several communication servers 58 in one or more central offices 14 can access database 120 stored in a central location to provide more intelligent management and provisioning of XDSL data service in communication system 10. One or more central offices 14 may be coupled together and the resources of their associated communication servers 58 shared using simple network management protocol (SNMP) techniques.

Program 121 contains instructions to be executed by processor 116 to perform the functions of controller 80. Program 121 may reside in database 120 as shown or may be integral to memory components in transceiver 108, detector 112, and/or processor 116. Program 121 may be written in machine code, pseudocode, or other appropriate programming language. Program 121 may include modifiable source code and other version control features that allow modification, debugging, and enhancement of the functionality of program 121.

Activity table 122, described in more detail below with reference to FIG. 7, maintains status information on data lines 54, switch 70, and output lines 72. In particular, activity table 122 contains information on inactive and active data lines 54, data lines 54 corresponding to current valid subscribers 16 of XDSL data service, and the mapping performed by switch 70 between data lines 54 and output lines 72. Moreover, activity table 122 includes information that specifies the inactivity of a modem in modem pool 74, the status of a data line 54 as dedicated, and any other suitable information that enables processor 116 to monitor and control the operation of switch 70 and modem pool 74.

Profile table 124 stores profile information on data lines 54. This profile information reflects electrical or physical characteristics of data line 54, its associated subscriber line 16 and data line 28, intervening components such as interface 24, splitter 25, splitter 50, and polling circuitry 100, as well as any other component or factor that effects the performance or electrical characteristics of signals received on data lines 54. Processor 116 may access profile table 124 and provide profile information to transceiver 108 using link 125. Alternatively, transceiver 108 may be a more robust and broadband device that does not need profile information from profile table 124. Processor 116 may also provide profile information to program XDSL modems in modem pool 74 once a coupling is made to a selected data line 54. The existence and complexity of profile information in profile table 124 depends on the requirements of transceiver 108 and XDSL modems in modem pool 74, as well as the complexity of signals that indicate a need for data service from subscriber 12.

Subscriber table 126 stores subscriber information indexed by one or more identifiers of subscriber 12, computer 22, modem 30, subscriber line 16, or other information that associates data line 54 with a particular subscriber 12. Subscriber table 126 includes subscriber connect times, session duration, session activity, session logs, billing data, subscriber account information, and any other suitable subscriber information. This information may be summarized and additional information included to generate billing and demographic data on subscribers 12 in communication system 10.

For example, subscriber table 126 may maintain summary statistics on the number of subscribers 12 served by communication server 58, the average connect time, load factors, time-of-day connection profiles, and other statistics to assess the communication facilities to be deployed at communication server 58, the over-subscription ratio that can be supported by communication system 10, and other provisioning and management issues. Furthermore, subscriber table 126 may combine subscriber information from one or more communication servers 58 in one or more central offices 14 in communication system 10.

Management interface 128 is coupled to processor 116 and database 120 and allows external access to the functionality of processor 116. Management interface 128 is also coupled to database 120, which allows modification of program 121, as well as remote access and modification of information in activity table 122, profile table 124, and subscriber table 126. In one embodiment, the telephone service provider or other entity that operates central office 14 or communication system 10 accesses management interface 128 to provide management and control over the operations of controller 80 and communication server 58. For example, the telephone service provider uses management interface 128 to access activity table 122 and/or subscriber table 126 to update the valid subscribers 12 that have access to communication server 58. A local or remote computer 130 is coupled to program interface 128 using an appropriate data link 132, such as a serial RS-232 link, to provide this management feature.

In operation, modem 30 in computer 22 indicates a need for data service, and communicates this need to an associated data line 54 using interface 24, data line 28, splitter 25, subscriber line 16, and splitter 50. In one embodiment, modem 30 transmits successive requests at a predetermined request interval. Processor 116 accesses activity table 122 to determine which data lines 54 to poll, depending on the active or inactive status of the data line 54, whether subscriber 12 corresponding to data line 54 is a current and valid subscriber, and other appropriate considerations. For example, activity table 122 may indicate valid and non-dedicated subscribers 12 to poll.

Polling circuitry 100 successively polls selected data lines 54, as directed by processor 116, using link 82 to detect a need for data service. For each data line 54 polled, processor 116 may access profile table 124 in database 120 and provide associated profile information to transceiver 108 using link 125. Polling circuitry 100 dwells on each data line 54 for a predetermined polling interval to detect a need. In one embodiment, the polling interval is at least two times a request interval of modem 30.

Upon detecting the need for data service associated with a selected data line 54 from polling circuitry 100, transceiver 108 may translate the information from the selected XDSL communication protocol employed on subscriber line 16 into digital or analog data for detection by detector 112. A media access controller (MAC) in detector 112 may transform serial digital data from transceiver 108 into a parallel digital format. Detector 112 receives the information translated by transceiver 108, and stores this information in a suitable memory location for access by processor 116. Processor 116 periodically accesses detector 112 to determine if a need for data service has been detected.

Upon detecting a need for data service, processor 116 accesses database 120 to determine the availability and status of modems in modem pool 74. Processor 116 selects an available modem from modem pool 74. Processor 116 then directs switch 70 to make the appropriate coupling between selected data line 54 and output line 72 coupled to the selected modem. Upon establishing coupling between modem 30 in computer 22 at subscriber 12 and a selected modem in modem pool 74, controller 80 continues to monitor the remaining data lines 54 using polling circuitry 100.

Processor 116 can transmit status or connection information to modem 30 in computer 22 using transceiver 108. This may be performed before, during, or after coupling the selected modem in modem pool 74 to data line 54. For example, processor 116 may send acknowledgment information to modem 30 that includes an indication that a modem is or is not available, an identification of the available modem, a time interval before modem 30 should attempt communication with the selected modem in modem pool 74, or any other suitable information. Furthermore, processor 116 may access information from subscriber table 126, such as billing and account information, historical connection information, or other suitable subscriber information, and transmit this information separate to or as part of the acknowledgment information described above.

Processor 116 may also transmit connection information and updated billing and subscriber information to modem 30 at computer 22 using link 86 and the associated XDSL modem in modem pool 74. This information may include the length of the current session, the current balance in the account of subscriber 12, as well as any other suitable information that relates to the account or activity of subscriber 12 with communication server 54. Generally, processor 116 may communicate any suitable information stored at or made available to controller 80 to subscribers 12 using transceiver 108 or the associated modem in modem pool 74.

Figure 4:
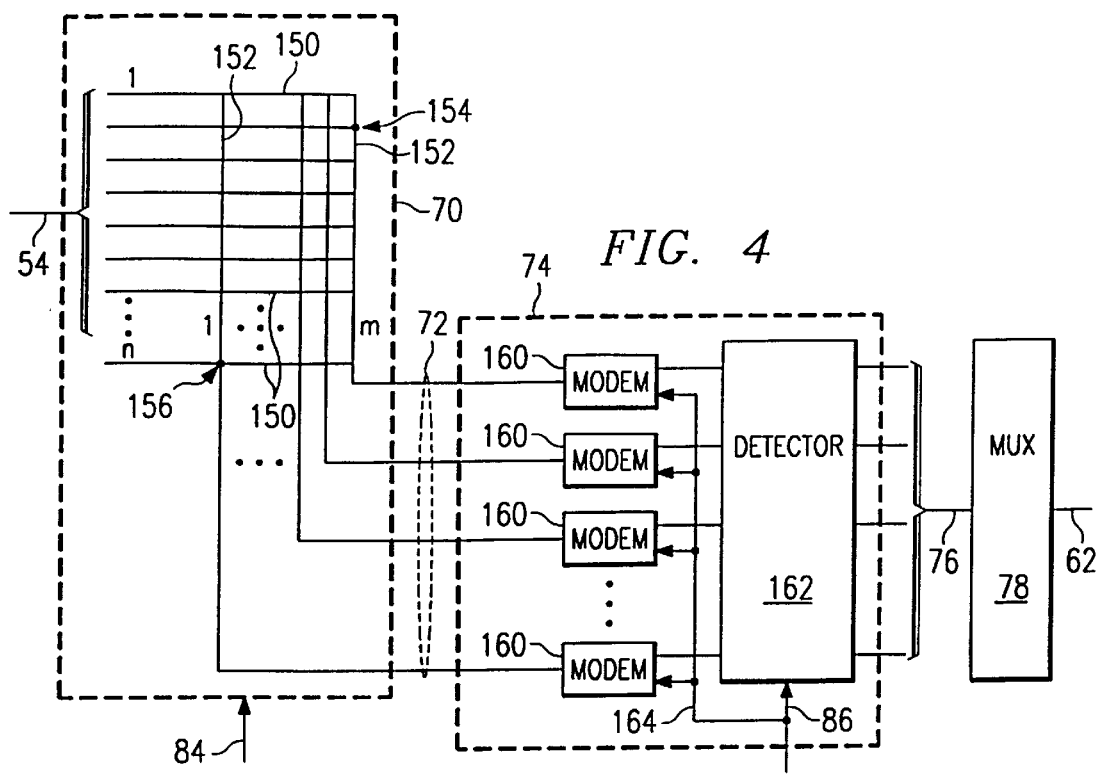
FIG. 4 illustrates in more detail the switch and modem pool of the communication server.

FIG. 4 illustrates in more detail switch 70 and modem pool 74 of communication server 58. Data lines 54 are coupled to switch 70, now shown in more detail as a cross-bar or cross-point matrix switch. In this particular embodiment, data lines 54 correspond to lines 150, and output lines 72 correspond to lines 152 in switch 70. The number of lines 150 (n) is greater than the number of lines 152 (m). This allows switch 70 to couple selected data lines 54 to a reduced number of output lines 72 to provide an over-subscription of XDSL data service in communication system 10. For example, switch 70 couples the second of lines 150 to the last of lines 152 by establishing connection 154. Similarly, switch 70 couples the last of lines 150 and the first of lines 152 by establishing connection 156.

Although switch 70 is shown in FIG. 4 to be a cross-bar or cross-point matrix switch, it should be understood that any device that can couple a number of data lines 54 to a reduced number of output lines 72 may be used. Switch 70 may incorporate electromagnetic components, such as relays and contacts, or may be implemented in whole or in part using one or more solid state devices.

Modem pool 74 includes XDSL modems 160 associated with output lines 72 from switch 70. Modems 160 translate information between an appropriate XDSL communication protocol on output lines 72 and an appropriate digital protocol on digital lines 76. In one embodiment, modems 160 may be similar in construction and operation to modem 30 at subscriber 12. A detector 162 coupled to modems 160 detects the activity of modems 160 to determine if the line has become inactive for a predetermined-interval of time. For example, if one of the modems 160 does not display activity over a five-minute interval, detector 162 generates a timeout indication to notify processor 116 of the inactive modem. Processor 116 releases or decouples the inactive modem for later subscriber sessions. In one embodiment, detectors 162 may include one-shot timers or other retriggerable timers set for a predetermined time interval to detect the inactive status of modems 160.

Detector 162 is a monitoring circuit that passes through the digital output of modems 160 to digital lines 76 for presentation to multiplexer 78. Multiplexer 78 may combine signals from digital lines 76 into a single multiplexed digital line 62. Alternatively, multiplexer 78 may employ any suitable reduction ratio that places signals on digital lines 76 on a fewer number of multiplexed digital lines 62.

Processor 116 may directly communicate with modems 160 using link 164. For example, link 164 allows processor 116 to program modems 160 with profile information retrieved from profile table 124. Link 164 also supports communication between processor 116 and selected subscribers 12 during an active subscriber session using modems 160. Moreover, link 164 allows processor 116 to monitor the information received from and transmitted to subscribers 12 during a communication session.

In operation, switch 70 couples a selected subset of data lines 54 to output lines 72 in response to signals received from controller 80 using link 84. Each of the output lines 72 is coupled to an associated modem 160 which translates the information formatted in an analog communication protocol, such as XDSL, into an appropriate digital signal. The digital information output from modems 160 passes through detector 162, which monitors the activity on the output line of modems 160. If detector 162 senses inactivity over a predetermined interval, a timeout indication is provided to processor 116 using link 86. Signals on digital lines 76 may be reduced to fewer multiplexed digital lines 62 using multiplexer 78.

Figure 5:
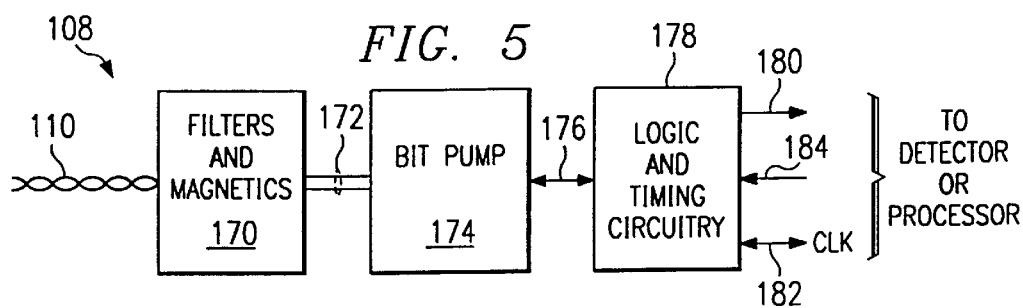
FIG. 5 illustrates in more detail the transceiver in the controller of the communication server.

FIG. 5 illustrates in more detail transceiver 108 in controller 80. To receive information, transceiver 108 includes filters and magnetics 170 to condition the signal from selected data line 54. The conditioned signal is provided over differential lines 172 to analog bit pump 174. Bit pump 174 performs the specific demodulation technique for the chosen XDSL communication protocol. For example, bit pump 174 may execute a discrete multi-tone demodulation (DMT) or carrierless amplitude phase demodulation (CAP) to demodulate an XDSL signal on differential lines 172 into a digital stream on line 176. Logic and timing circuitry 178 contains decode logic, timing and synchronization circuitry, steering logic, and other appropriate digital processing circuitry to produce a data signal on receive data line 180 and a corresponding clock signal on clock line 182 for delivery to detector 112 or processor 116. Detector 112 may include a MAC to support any digital protocol or signal detection that indicates a need for XDSL data service. The data may be in non-return-to-zero format or any other suitable format.

To transmit information, transceiver 108 receives a data signal on transmit data line 184 from detector 112 or processor 116. Using the clock line 182, logic and timing circuitry 178 digitally processes signals received on transmit data line 184 for delivery to analog bit pump 174. Using an appropriate modulation technique, such as DMT or CAP, analog bit pump 174 produces an analog signal for delivery over differential lines 172 to filters and magnetics 170 for transmission over selected data line 54.

Figure 6:
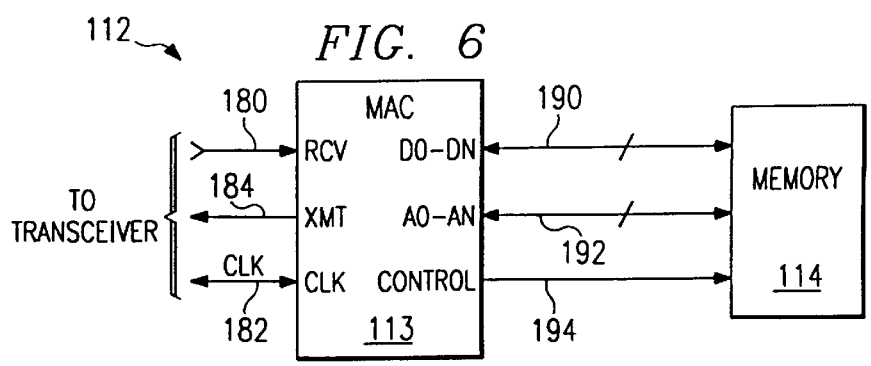
FIG. 6 illustrates in more detail the detector in the controller of the communication server.

FIG. 6 illustrates in more detail a specific embodiment of detector 112 that includes a MAC 113 and a memory 114. MAC 113 is coupled to receive data line 180 and clock line 182, and translates received data from a serial data format, such as a non-return-to-zero format, into an appropriate parallel digital format. MAC 113 translates the data from the chosen digital protocol and provides the data to memory 114 using data bus 190. MAC 113 also provides an address to memory 114 using address bus 192 to specify the location in memory 114 to store data provided on data bus 190. In addition, MAC 113 provides a write signal to memory 114 using control line 194.

To transmit data, MAC 113 provides a read signal to memory 114 using control line 194, and an associated address of the data to be read using address bus 192. In response, memory 114 provides the requested data on data bus 190. MAC 113 translates the data into the selected digital protocol for placement on transmit data line 184.

Figure 7:
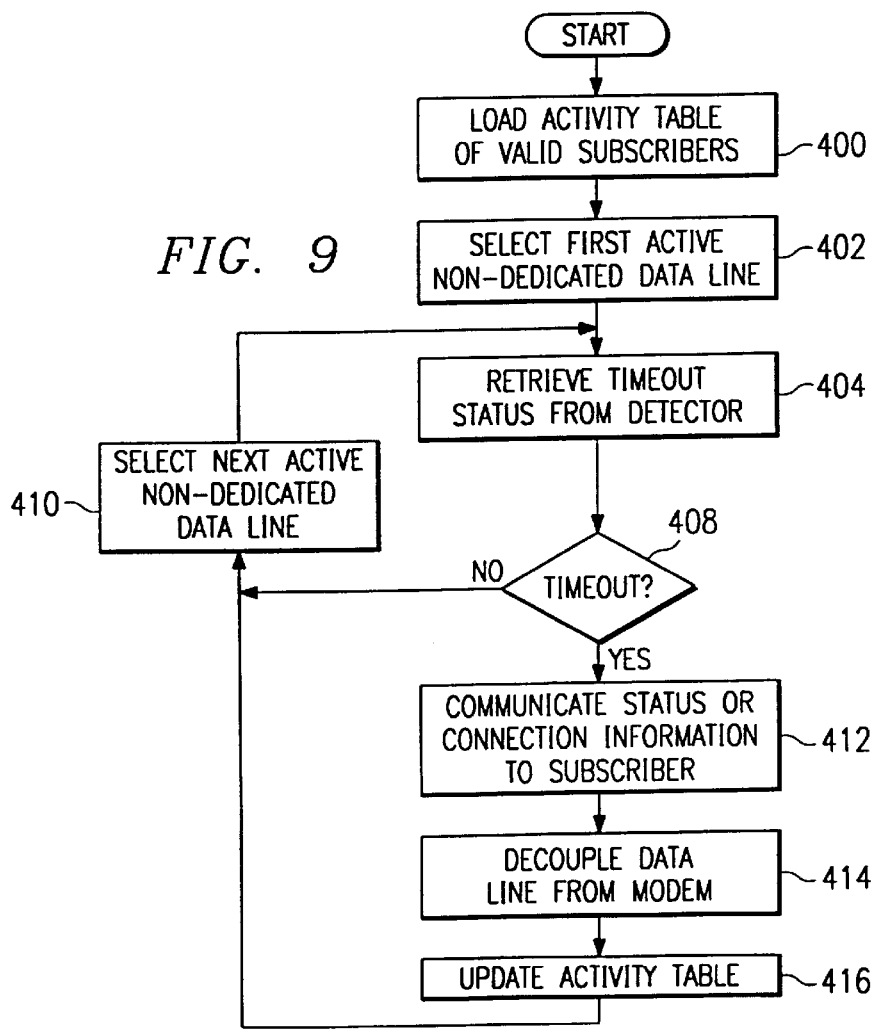
FIG. 7 illustrates an activity table used by the controller of the communication server.

FIG. 7 illustrates one embodiment of activity table 122 stored in database 120 of controller 80. Processor 116 accesses and modifies entries in activity table 122 to direct the operation of controller 80. In addition, management interface 128 provides external access to activity table 122. For example, a telephone service provider using management interface 128 can add, delete, or otherwise modify entries in activity table 122 to maintain a listing of valid subscribers 12. Database 120 stores some or all of the status information shown in this exemplary activity table 122, as well as other information that may be used by processor 116 to direct the activities of controller 80.

Activity table 122 includes a data line column 200 that contains an address or other appropriate identifier of data lines 54 associated with subscriber lines 16 and their related subscribers 12. Status column 202 indicates the status of data line 54 identified in data line column 200. For example, status column 202 may contain one or more indications that the associated data line 54 is inactive (I), active (A), or dedicated (D). A timeout column 204 indicates whether detector 162 in modem pool 74 has detected a timeout associated with a particular data line 54. A modem column 206 includes an identifier of the modem 160 associated with the corresponding data line 54.

An entry in activity table 122 corresponds to a row that designates a selected data line 54 in data line column 200, the status of the selected data line 54 in status column 202, a timeout indication of the selected data line 54 in timeout column 204, and the modem associated with the selected data line 54 in modem column 206. For example, entry 208 relates to data line "D1" which is inactive. Entry 210 represents data line "D2" which is inactive but dedicated to modem "M1." Entry 212 indicates that data line "D4" is active, coupled to modem "M3," but a timeout indication has been detected.

Subscribers 12 indicated in status column 202 as dedicated may be serviced by communication server 58 in a specific way. Switch 70 in communication server 58 maintains a coupling between data line 54 corresponding to dedicated subscriber 12 and its associated and dedicated modem 160. In this manner, controller 80 need not detect a need for data service or reconfigure the couplings for data line 54 corresponding to dedicated subscriber 12. In this manner, communication server 58 provides the option of a different class of service for a dedicated subscriber 12 that desires uninterrupted access to XDSL communication facilities.

Figure 8:
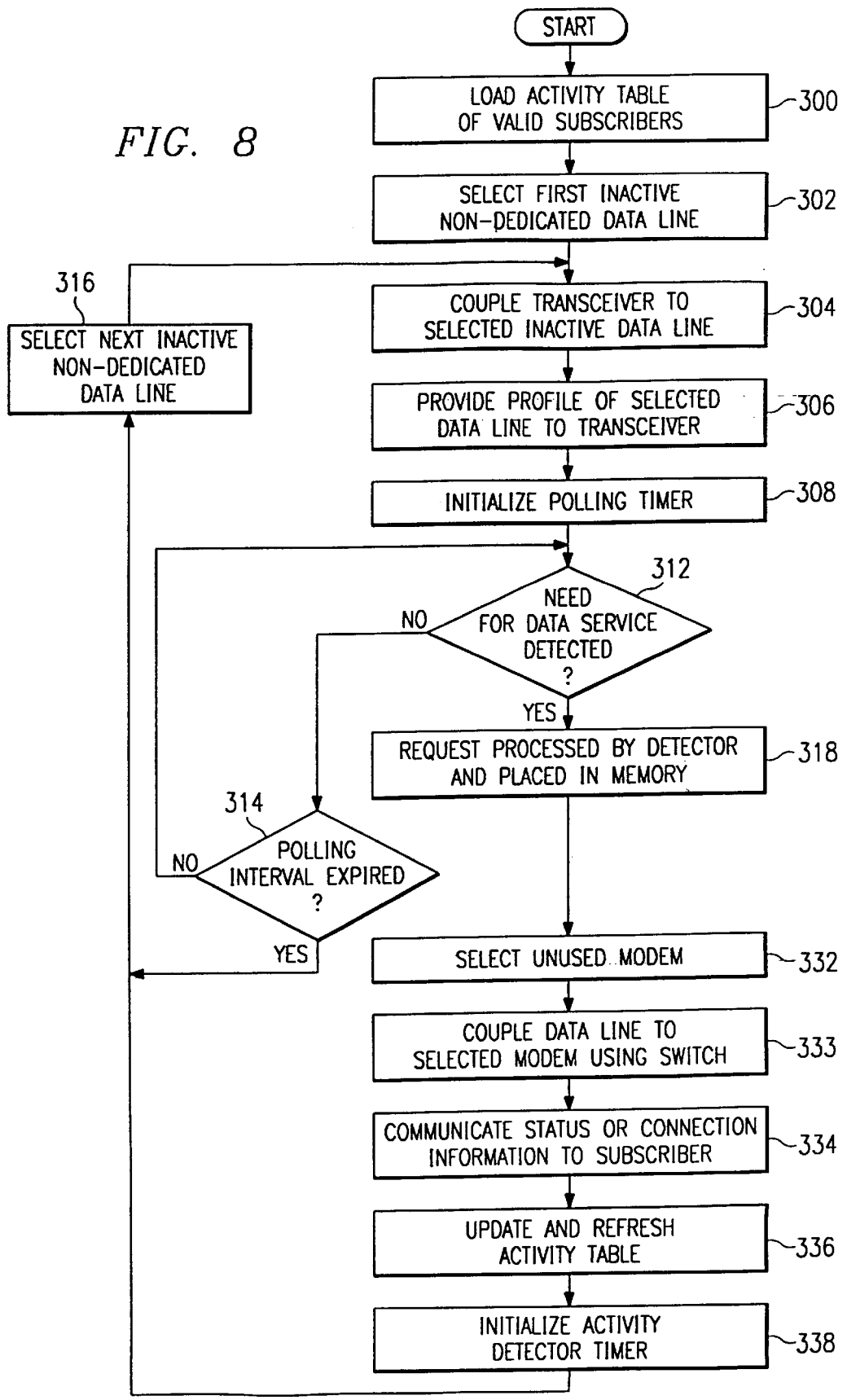
FIG. 8 is a flow chart of a method for coupling a data line to a modem in the communication server.

FIG. 8 is a flow chart of a method performed at controller 80 to couple data lines 54 to modems 160 in modem pool 74. The method begins at step 300 where processor 116 of controller 80 loads activity table 122 from database 120 which contains an entry for each valid subscriber 12 served by communication server 58. Using management interface 128, a telephone service provider may ensure that activity table 122 reflects valid subscribers 12 by monitoring past due accounts, the overuse of data service, successive invalid attempts to access communication server 54, or other factors that may cause subscribers 12 to be invalid. Processor 116 selects the first inactive and non-dedicated data line 54 indicated by the designation "I" in status column 202 of activity table 122. Since switch 70 is configured to continuously couple dedicated subscribers 12 to their dedicated modems 160, processor 116 need not select an inactive data line 54 that is also-dedicated, as indicated by the designation "I/D" in status column 202.

Using input/output circuitry 118, processor 116 directs switch 104 of polling circuitry 100 to couple transceiver 108 to the selected inactive and non-dedicated data line 54 at step 304. If appropriate, processor 116 accesses profile table 124 in database 120 and provides profile information for the selected data line 54 to transceiver 108 using link 125 at step 306. Processor 116 initializes timer 117 with a predetermined polling interval at step 308.

If a need for data service has not been detected by transceiver 108 at step 312, then processor 116 checks timer 117 at step 314. If the polling interval monitored by timer 117 has not expired at step 314, then processor 116 again determines if a need has been detected at step 312. However, if the polling interval monitored by timer 117 has expired at step 314, processor 116 selects the next inactive and non-dedicated data line 54 as indicated in status column 202 of activity table 122 at step 316, and returns to step 304.

If a need for data service is detected at step 312, the associated information may be further processed by detector 112 and placed in memory for access by processor 116 at step 318. Before, during, or after step 318, transceiver 108, detector 112, and/or processor 116 may validate the need for data service. Validation may be performed at a low level, such as a verification of the checksum or detection of an incomplete transmission, or at a higher level, such as a verification of an identifier, password, or other security information that provides access to communication server 58. Validation contemplates any level of validation or security handshake that confirms that the received need is valid and accepted by controller 80.

Upon selecting an unused modem at step 332, processor 116 generates a command that directs switch 70 to couple the selected data line 54 to the selected modem 160 at step 333. Processor 116 may communicate status or connection information to subscriber 12 using transceiver 108 or the selected modem 160 at step 334. Processor 116 updates activity table 122 at step 336 to indicate that the selected data line 54 is now active and that the selected modem 160 is now being used. Processor 116 directs activity detector 162 to initialize the inactivity interval for the selected modem 160 at step 338. Processor 116 then selects the next inactive and non-dedicated data line 54 in activity table 122 at step 316, and returns to step 304.

FIG. 9 is a flow chart of a method for monitoring and decoupling modems 160 due to inactivity. It should be understood that the methods described with reference to FIGS. 8 and 9 may be performed simultaneously or in alternative succession by processor 116 to couple and decouple data lines 54 with modems 160. The method begins at step 400 where processor 116 loads activity table 122 which contains an entry for each valid subscriber 12 served by communication server 58. Processor 116 selects a first active and non-dedicated data line 54 as indicated by the designation "A" in status column 202 of activity table 122 at step 402. Since switch 70 is configured to maintain a coupling between dedicated subscribers 12 and their dedicated modems 160, processor 116 need not select an active data line 54 that is also dedicated, as indicated by the designation "A/D" in status column 202.

Processor 116 retrieves timeout status for modem 160 associated with the selected active data line 54 from detector 162 using link 86 and input/output circuitry 118 at step 404. Processor 116 determines if a timeout has occurred for the selected active data line 54 at step 408. If a timeout has not occurred, processor 116 selects the next active and non-dedicated data line 54 as indicated in status column 202 of activity table 122 at step 410, and returns to step 404.

If a timeout has occurred at step 408, processor 116 may communicate status or connection information to subscriber 12 associated with the selected active data line 54 using transceiver 108 or the associated modem 160 at step 412. Processor 116 generates a command to direct switch 70 to decouple the active data line 54 from its associated modem 160 at step 414. Processor 116 updates activity table 122 at step 416 to indicate that data line 54 is now inactive and that the associated modem 160 is available for another subscriber session.

FIG. 10A illustrates another implementation of communication server 58 in communication system 10. Communication server 58 of FIG. 10A is different from the implementation described above in that it provides switching at an isolated four-wire interface although much of the components and functions otherwise are the same. As shown in FIG. 10A, data lines 54 are coupled to and received by a plurality of line interface units 500. Each line interface 500 provides an analog interface, line driver and transformer for processing signals on data lines 54. Each line interface unit 500 is coupled to a switching matrix 502 and communicates with switching matrix 502 across a transmit data pair 504 and a receive data pair 506. Each line interface unit 500 operates to interface between transmit data pair 504 and receive data pair 505 and twisted pair data line 54.

In the implementation of FIG. 10A, a detector 508 is coupled to each receive data pair 506. Each detector 508 operates to detect a request for service on the associated receive data pair 506 and, upon detection, provides a signal to controller 80 indicating a request for service. Detector 508 is shown in more detail in FIG. 10D, and implementations of detectors are shown in more detail in FIGS. 11A, 11B and 11C. It should be understood that other implementations can combine polling with multiple detectors to reduce the number of inputs to controller 80 and to reduce the number of detectors. For example, FIG. 3 shows an implementation using polling circuitry 100 that can be used with the detector in the communications server embodiment of FIG. 10A.

As shown, switching matrix 502 is coupled to a modem pool 510 and communicates with modem pool 510 across transmit data pairs 512 and receive data pairs 514. Transmit data pairs 512 and receive data pairs 514 contain a number of pairs equal to the number of modems in modem pool 510. As described above, modems in modem pool 510 convert signals in an appropriate XDSL communication protocol into digital data in an appropriate digital protocol on digital lines 76. Multiplexer 78 is then coupled to digital line 76 and provides a multiplexed digital line output 62. Also as described above, controller 80 provides switch control signals 84 to switching matrix 502 and communicates modem selection and control information 86 with modem pool 510.

In operation, each detector 508 detects a request for service on the associated receive data pair 506 and informs controller 80 that a request for service has occurred. Controller 80 then checks which modems in model pool 510 are assigned and which data lines 54 are valid. Controller 80 assigns a modem from modem pool 510 to the requesting data line 54 using switching matrix 502 to connect the associated receive data pair 506 and transmit data pair 504 to the appropriate receive data pair 514 and transmit data pair 512.

A technical advantage of providing switching at a four-wire interface within communication server 58 is that switching matrix 502 is isolated from data lines 54 and subscriber lines 16 by transformers in line interface units 500. Because of this isolation, switching matrix 502 can operate without constraints imposed by technical requirements for interaction with data lines 54 and subscriber lines 16. For example, the isolation of switching matrix 502 allows CMOS switches to be used rather than more expensive solid state relays or mechanical relays.

FIG. 10B illustrates in more detail line interface device 500 of communication server 58 of FIG. 10A. Line interface device 500 includes a line protection circuit 520 that is coupled to and receives data line 54. Line protection circuit 54 operates to ensure that activity down stream in communication server 58 does not affect the integrity of data line 54. Line protection circuit 520 is coupled to a magnetics/hybrid unit 522. Magnetics/hybrid unit 522 can comprise a transformer and operates to interface between the data line and an internal transmit data pair 524 and receive data pair 526. Magnetics/hybrid unit 522 also isolates the four-wire interface provided by internal receive data pair 526 and transmit data pair 524 from data line 54.

A line receiver 528 receives receive data pair 526 and drives signals to a receive filter 530. The output of receive filter 530 is receive data pair 506 which is coupled to switching matrix 502 as shown in FIG. 10A. Similarly, transmit data pair 504 is coupled to a transmit filter 532 which provides signals to a cable driver 534. Cable driver 534 then drives signals on transmit data pair 524 to magnetics/hybrid unit 522.

Figure 10C:
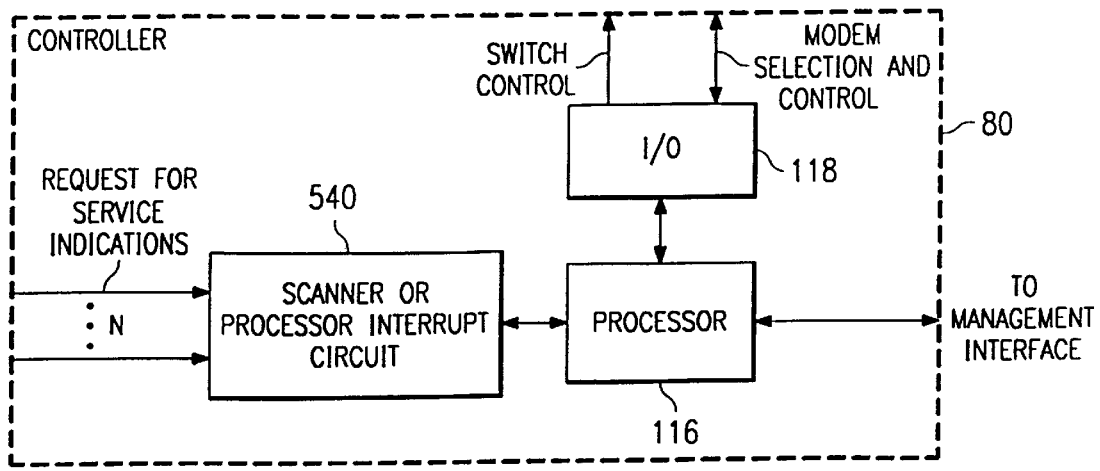
FIG. 10C illustrates in more detail the controller of the communication server of FIG. 10A.

FIG. 10C illustrates in more detail controller 80 of communication server 58 where a plurality of detectors provide indications of a request for service. Controller 80 of FIG. 10C includes processor 116 and input/output circuitry 118 as discussed above with respect to FIG. 3. Controller 80 also includes a scanner or processor interrupt circuit 540 which receives the request for service indications from detectors 508 and provides a scanner output or processor interrupt to processor 116. This allows the outputs of a number of detectors 508 to be sampled to provide an appropriate signal to processor 116 when a request for service has been detected. As mentioned above, it should be understood that selection of the number of detectors and the amount of polling can be made as appropriate for the desired application. In one implementation, scanner or processor interrupt circuit 540 comprises a gate array having logic circuitry for generating appropriate interrupt signals to processor 116.

Figure 10D:
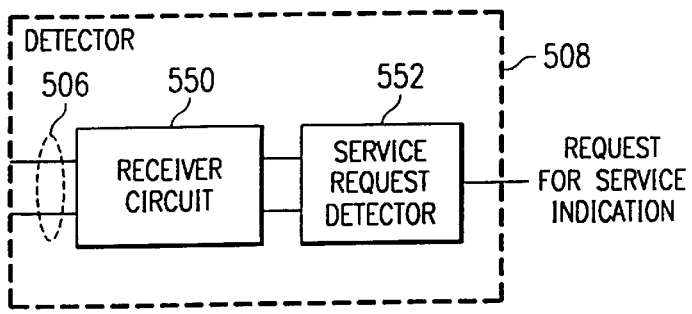
FIG. 10D illustrates in more detail a detector of the communication server of FIG. 10A.

FIG. 10D illustrates in more detail a detector 508 of communication server 58. As shown, detector 508 includes a receiver circuit 550 and a service request detector 552. Receiver circuit 550 is coupled to a receive data pair 506 and provides an output to service request detector 552. Service request detector 552 then operates to identify a request for service. Upon detection, service request detector 552 provides a signal indicating a request for service to controller 80. For ADSL systems (e.g., CAP and DMT), the request for service can be an initial tone that is a pure sinusoid or a modulated sinusoid. Three implementations of a detector 508 are illustrated in more detail in FIGS. 11A, 11B and 11C and described below.

Figure 10E:
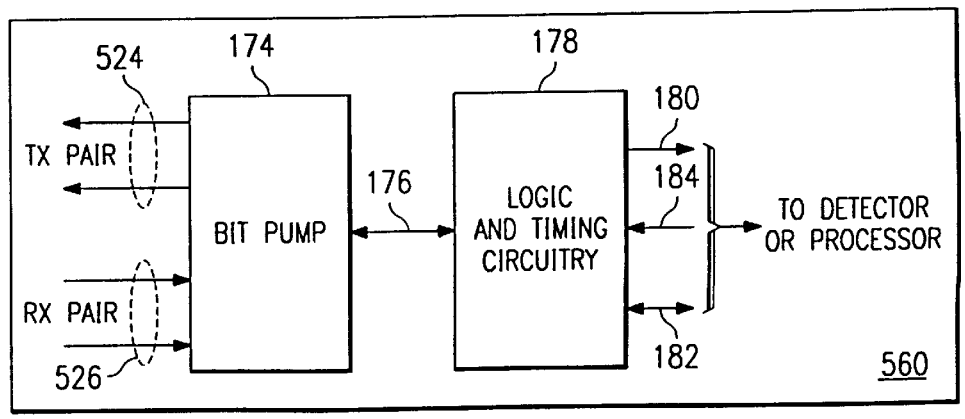
FIG. 10E illustrates in more detail a modem in the modem pool of the communication server of FIG. 10A.

FIG. 10E illustrates in more detail a modem 560 in modem pool 510 of communication server 58. Modem 560 is analogous to modem 108 of FIG. 5 with filters and magnetics 170 removed. Modem 560 includes a bit pump 174 which communicates with switching matrix 502 across receive data pair 526 and transmit data pair 524. Modem 560 does not need to include filters and magnetics 170 because of the functions provided by line interface units 500 to create the four-wire interface described above. Bit pump 174 and logic and timing circuitry 178 otherwise operate as discussed with respect to FIG. 5. Conceptually, the implementation of FIG. 10A moves the function of filters and magnetics 170 of modem 108 to line interface units 500 to isolate switching matrix 502 from data lines 54.

FIG. 11A illustrates in more detail an analog filter implementation of a detector 508 of communication server 58. Detector 508 of FIG. 11A detects the tone or modulated tone using an analog filter circuit tuned to the distinct frequency used to transmit a subscriber request for service. Detector 508 comprises a differential receiver 570 that is coupled to an associated receive data pair 506. Differential receiver 570 is coupled to and provides a signal to a band pass filter 572. Band pass filter 572 is coupled to a gain device 574 which is coupled to a signal processing circuit 576. The output of signal processing circuit 576 is coupled to a rectifier circuit 578 which is coupled to a low pass filter 580. The output of low pass filter 580 is then provided as one input to a voltage comparator 582. The other input to voltage comparator 582 is connected to a reference voltage 584.

In operation, detector 508 operates to detect a tone or modulated tone that indicates a request for service on receive data pair 506. Differential receiver 570 produces a voltage output which is filtered by band pass filter 572 and provided to gain device 574. Gain device 574 then amplifies the signal and provides it to signal processing circuit 576. The signal processing circuit 576 processes or demodulates the XDSL signals generated at the customer location that indicate a request for data service. Signal processing circuit 476 provides the signal to rectifier circuit 578 that outputs the signal to low pass filter 580. Low pass filter 580 filters low frequency noise to provide a DC voltage as an input to voltage comparator 582. Voltage comparator 582 compares that DC voltage with reference voltage 584 and outputs a logic high when the DC voltage is greater than reference voltage 584. Reference voltage 584 is set so that voltage comparator 582 signals a request for service only when the appropriate tone or modulated tone is present on receiver data pair 506.

It should be understood that detector 508 of FIG. 11A, as well as those of FIGS. 11B and 11C, can be connected to polling circuit 100 of FIG. 3 or other polling circuits to reduce the number of detectors required or to scan the outputs of the detectors. The number of lines that can be polled by a single polling circuit is generally limited by the amount of time that is required by the detector to reliably detect the subscriber request for service.

FIG. 11B illustrates in more detail a tone decoder implementation of detector 508 of communication server 58. Detector 508 comprises a differential receiver 590 that is coupled to receive data pair 506 and provides an output to a band pass filter 592. Band pass filter 592 is coupled to a gain device 594 which provides an output to a signal processing circuit 596. The signal processing circuit 576 processes or demodulates the XDSL signals generated at the customer location that indicate a request for data service. The output of signal processing device 596 is then coupled to a tone decoder circuit 598. Tone decoder integrated circuit 598 provides an output to controller 80 indicating a request for service upon detection.

In one implementation, tone decoder circuit 598 comprises an integrated circuit, and specifically is an LMCS67 tone decoder available from NATIONAL SEMICONDUCTOR. In this implementation, tone decoder circuit 598 includes a phase locked loop detector for identifying the tone or modulated tone that indicates a request for service. The phased locked loop detects when the received tone or modulated tone matches the signaling frequency, and the tone detector circuit responds by signaling a request for service.

FIG. 11C illustrates in more detail a digital signal processor implementation of detector 508 of the communication server 58. Detector 508 of FIG. 11C comprises a polling circuit 600 that is coupled to a plurality of receive data pairs 506. Polling circuit selects each receive data pair 506 and connects it to a line receiver 602. Line receiver 602 is coupled to a filter 604 which is coupled to an analog/digital converter 606. Analog/digital converter converts the signal to a digital signal and provides an output to a digital signal processor 608. Upon detection, digital signal processor provides a request for service indication to controller 80.

In the implementation of FIG. 11C, polling circuitry 600 connects line receiver 602, filter 604, analog/digital converter 606 and digital signal processor 608 to each line in succession. Digital signal processor 608 reads the data from the analog/digital converter 606 and demodulates or detects the request for service. The dwell time for polling circuitry 600 can be set, for example, such that detector 508 can poll the lines in less than half the duration of the subscriber request for service tone or modulated tone. The number of lines that can be polled by a single digital signal processor 608 is then determined by the amount of time required for digital signal processor 608 to reliably perform the detection algorithm and the duration of the tone described above.

Digital signal processor 608 is programmable to detect the subscriber request for service tone or modulated tone using an appropriate tone detection algorithm or demodulation algorithm. One advantage provided by the detector implementation of FIG. 11C is this programmability of the algorithm within digital signal processor 608.

It should be understood that the tones used to indicate service in the above description of FIGS. 11A, 11B, and 11C, may be the tone used in standard non-switched applications of XDSL modems, or may be additional tones added specifically to facilitate detection in switching.

Figure 12:
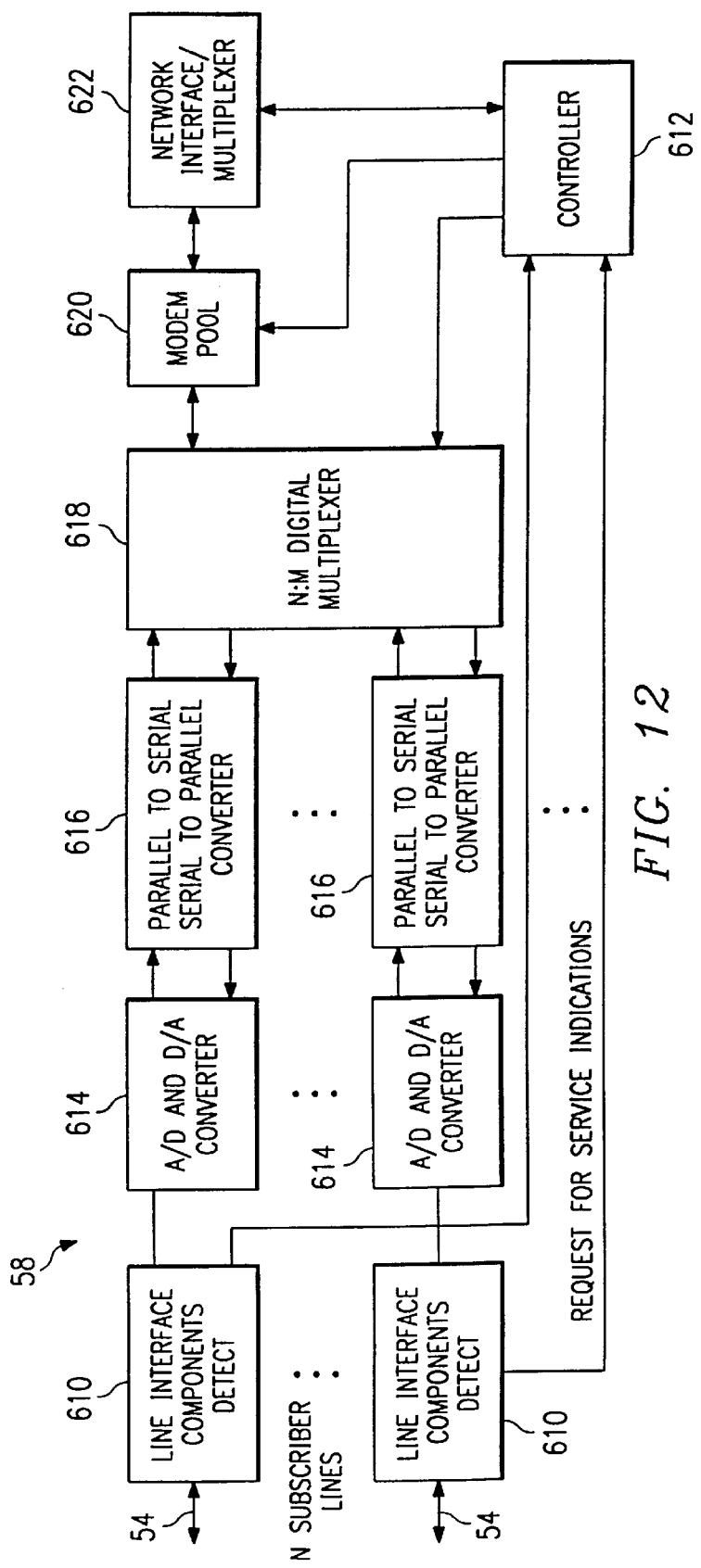
FIG. 12 illustrates in more detail a digital switching matrix implementation of the switch of the communication server.

FIG. 12 illustrates in more detail a digital switching matrix implementation of communication server 58. The implementation of FIG. 12 is appropriate for both a two-wire and four-wire interface to provide digital switching of the modem connections. Communications server 58 of FIG. 12 includes line interface components and data off-hook detection units 610 that interface with subscriber lines 54 and detect subscriber requests for service. Request for service indications are then provided to controller 612 for controlling the modem connections.

Each line interface and detection unit 610 is coupled to an associated analog/digital and digital/analog converter 614. Converters 614 are in turn connected to parallel/serial and serial/parallel converters 616. Converters 616 are coupled to a digital multiplexer 618 which operates under control of controller 612 to connect converters 616 to assigned modems in modem pool 620. Modems in modem pool 620 are coupled to a network interface/multiplexer 622 and can be implemented using digital signal processors. As shown, network interface/multiplexer 622 is coupled to and communicates with controller 612. This allows network interface/multiplexer 622 to know which modems and lines are active without having to monitor the communication traffic on the lines.

In operation, incoming communications are converted to digital words by converters 614 and then converted to serial bit streams by converters. The serial bit streams are connected to an assigned modem by digital multiplexer 618. The modems in modem pool 620 then communicate with network interface/multiplexer 622. For outgoing communications, the process is reversed. Serial bit streams from the modems are converted to parallel words and then to analog signals for transmission on data lines 54. This digital switching implementation of communication server 58 can be advantageous for switching of higher frequency XDSL communications.

Figure 13B:
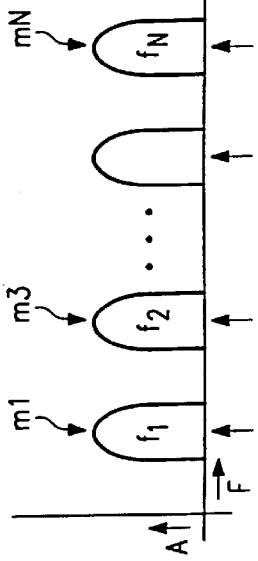
FIG. 13B is a diagram of frequencies used in the switch of FIG. 13A.
Figure 13A:
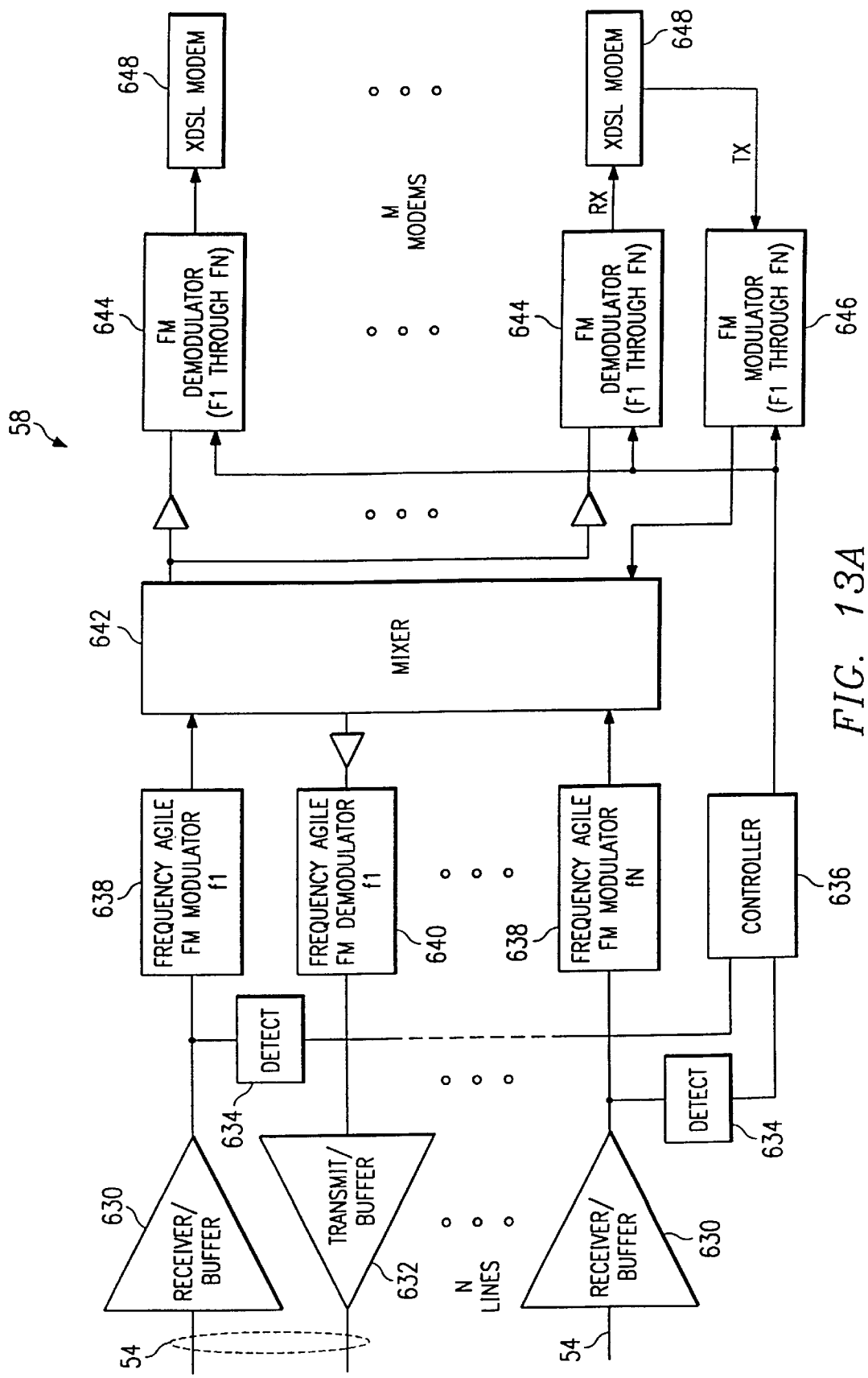
FIG. 13A illustrates in more detail a frequency multiplexing implementation of the switch of the communications server.

FIG. 13A illustrates in more detail a frequency multiplexing implementation for switching modem connections in communications server 58. This frequency multiplexing implementation could be appropriate for being located at a cable operator as well as a central office of a telephone network. As shown, data lines 54 are coupled to receiver/buffers 630 and transmit/buffers 632. Data off-hook detectors 634 are coupled to the output of receiver/buffers 630 and provide request for service indications to controller 636. For each data line 54, communications server 58 includes a frequency agile modulator 638 and a frequency agile demodulator 640. Each modulator 638 operates to modulate an incoming analog signal at a selectable frequency. In the illustrated embodiment, the frequency is set to one of a plurality of frequencies, f1 to fN, equal in number to the number of available modems. Similarly, each demodulator 640 operates to demodulate at a selectable frequency where the frequency is set to one of the plurality of frequencies, f1 to fN. Associated modulators 638 and demodulators 640 are set to operate at the same frequency.

Modulators 638 provide signals to and demodulators 640 receive signals from a mixer 642. Mixer 642 mixes the signals from modulators 638 and provides the combined signal to demodulators 644. Each demodulator 644 operates to demodulate the incoming signal at one of the frequencies, f1 to fN, as designated by controller 636. Each demodulator 644 is coupled to and provides the demodulated signal to an associated modem 648 in the modem pool. By designating the appropriate frequency, controller 636 effectively connects an assigned a modem 648 to a data line 54.

Outgoing signals are processed in an analogous manner. Each modem 648 provides outgoing analog signals to an associated modulator 646 designated to operate at the same frequency as the associated demodulator 644. Modulators 646 modulate the analog signal and provide the modulated signal to mixer 642. Mixer 642 combines the modulated signals and provides the combined signal to each demodulator 640. Demodulators 640 demodulate the combined signal to recover the appropriate analog signal at their selected frequency and provide the demodulated analog signal to transmit/buffers 632 for transmission. In this manner, modems 648 are connected to data lines 540 by modulating and demodulating signals at one of the frequencies, f1 to fN.

FIG. 13B is a diagram of frequencies, f1 to fN, used in the implementation of FIG. 13A. This results in each of the modems, m1 to mN, being assigned to one of the frequencies, f1 to fN, based upon the frequency for the connected data line 54, as shown. In order to connect a data line 54 to a assigned modem 648, modulators 644 and demodulators 646 are designated to operate at the frequency of the modulator 638 and demodulator 640 for that data line 54.

Figure 14A:
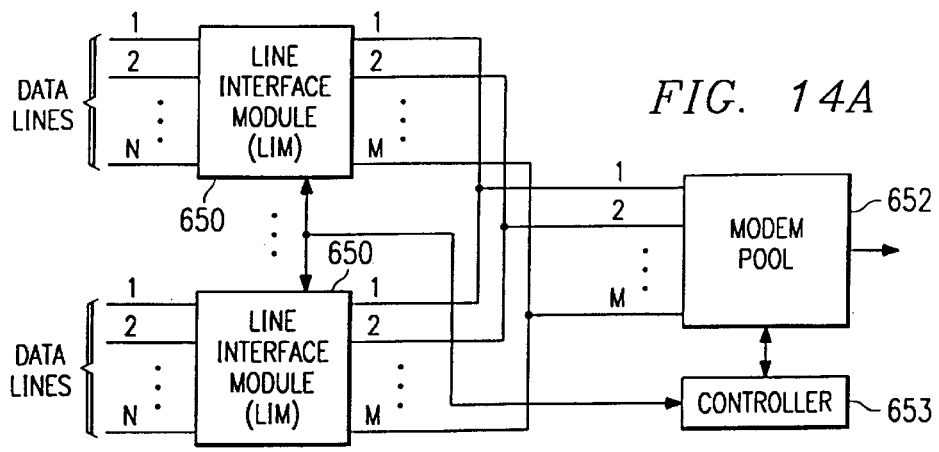
FIG. 14A illustrates line interface modules and the modem pool of a distributed switching implementation of the communication server.

FIG. 14A illustrates line interface modules (LIM) 650 and modem pool 652 of a distributed switching implementation of communication server 58. A controller 653 is coupled to line interface modules 650 and to modem pool 652. As shown, a plurality of line interface modules 650 are coupled to the data lines and to modem pool 652. Each line interface module 650 is operable to detect a request for service on the data lines and to connect each of the data lines it receives to each modem in modem pool 652. Controller 653 operates to select a modem from modem pool 652 in response to a detected request for service. Controller 653 then directs the appropriate line interface module 650 to connect the requesting data line to the selected modem. In the illustrated implementation, each line interface module 650 receives N data lines and includes switches to connect the N data lines to any of the M modems in modem pool 652. In this manner, the switching function is distributed across line interface modules 650 and is scalable as support for more data lines is added. In addition, although a two-wire interface is shown, the architecture of FIG. 14A can be used at a two-wire or four-wire interface.

Line interface modules 650 allow switching capabilities to be scalable with the desired number of modems and over-subscription. As an example, one implementation has four data lines connected to each line interface module 650 and thirty-two modems in modem pool 652. For a 10:1 over-subscription, this implementation would use 80 line interface modules 650 for connecting 320 data lines to the 32 modems in modem pool 652. In order to double the number of supported data lines, another 80 line interface modules 650 could be added along with another 32 modems. On the other hand, if a 5:1 over-subscription for 32 modems is desired, 40 line interface modules 650 would be used to service 160 data lines.

Figure 14B:
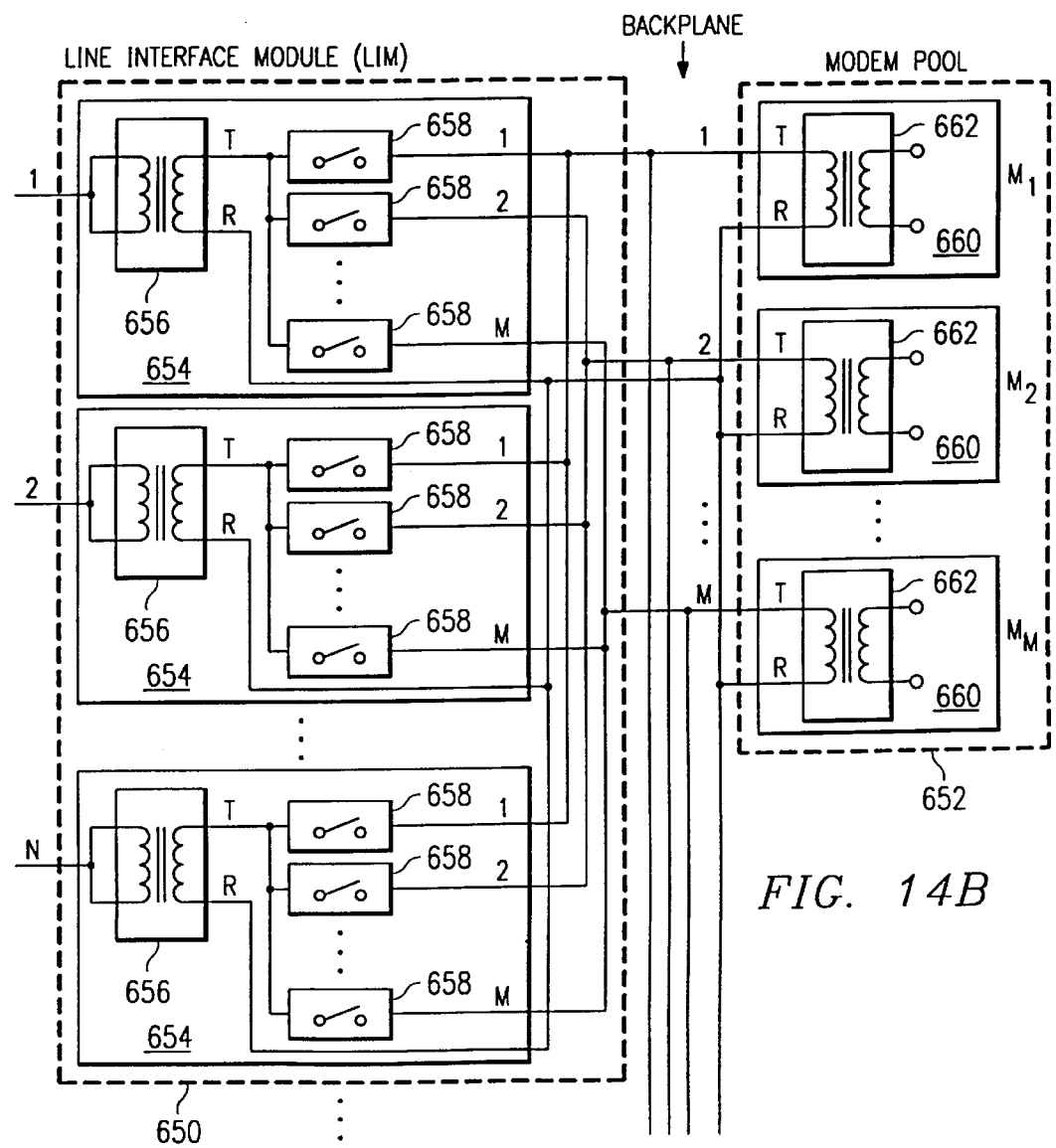
FIG. 14B illustrates in more detail the line interface modules and the modem pool of the communication server of FIG. 14A.

FIG. 14B illustrates in more detail line interface modules 650 and modems 660 in modem pool 652. As shown, each line interface module 650 includes a plurality of line interface units 654 that receive one of the N tip and ring data lines. Each line interface device 654 includes magnetics 656 and a plurality of switches 658. In the illustrated implementation, magnetics 656 includes a transformer that receives tip and ring lines of the associated data line. As shown in FIG. 14B, a T line is then provided to a plurality of switches 658 for connecting the T line to one of M outgoing lines. As shown, the M outgoing lines are equal in number to the number of modems 660 in modem pool 652.

Then outputs of each line interface device 654 are connected together so that line interface module 650 has one output line for each modem 660 in modem pool 652 in addition to one output for the R lines. It should be understood that this can be implemented differentially using a pair of switches to switch the modem to the data line, rather than a single switch and a common R line, to enable switching R lines as well.

Modem pool 652 includes a plurality of modems 660 of which only the front-end portion are shown. Each modem 660 receives two lines from line interface modules 650 using magnetics 662. Because of magnetics 656 and magnetics 662, the switching and connections between line interface devices 654 and modems 660 are isolated from the data lines and from the back-end of modems 660. In one implementation, the connections between line interface modules 650 and modems 660 are accomplished on the back plane of a telecommunications chassis, and the line interface modules 650 and modems 660 are implemented as cards that plug into the back plane. In this implementation, a controller communicates with line interface modules 650 and modems 660 to control switching connections to modems 660.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication server, comprising:
    a modem pool comprising a plurality of modems;
    a plurality of line interface modules, each line interface module:
        having a plurality of inputs and a plurality of outputs; and
        operable to couple each input to separate outputs associated with different modems in the modem pool; and
    a controller coupled to the plurality of line interfaces modules, the controller operable:
        to select a modem in response to a request for service on an input of a line interface module; and
        to direct the line interface module to which the requesting input is coupled to couple the requesting input to an output associated with the selected modem.

2. The communication server of claim 1, wherein each line interface module comprises a plurality of line interface devices, each line interface device receiving a twisted pair data line as an input and operable to couple the twisted pair data line to the output associated with the selected modem.

3. The communication server of claim 2, wherein each line interface device comprises:
    a transformer coupled to the twisted pair data line and providing a T line and an R line as outputs;
    a plurality of switches equal in number to the plurality of modems, each switch coupled to the T line and operable to couple the T line to one of the modems; and
    the R line coupled to all of the modems.

4. The communication server of claim 3, wherein each modem comprises a transformer, the transformer coupled to the R line provided by each line interface device in each line interface module, and the transformer coupled to one switch in each line interface device of each line interface module.

5. The communication server of claim 1, wherein the line interface modules, modems and controller are implemented as cards that plug into a telecommunications chassis.

6. The communication server of claim 1, wherein the modem pool comprises thirty-two modems, and wherein each line interface module has four inputs and has thirty-two outputs coupled to modems.

7. A line interface module, comprising:
    a plurality of inputs, each input operable to connect to a separate data line; and
    a plurality of outputs, each output operable to connect to a separate modem in a modem pool; and
    the line interface module operable to couple a requesting data line to an output associated with a selected modem, where the selected modem can be any one of the modems in the modem pool.

8. The line interface module of claim 7, further comprising a plurality of line interface devices, each line interface device receiving a data line and operable to couple the data line to the output associated with the selected modem.

9. The line interface module of claim 8, wherein each line interface device comprises:
    a transformer coupled to the data line and providing a T line and an R line as outputs;
    a plurality of switches equal in number to the plurality of modems, each switch coupled to the T line and operable to couple the T line to one of the modems; and
    the R line coupled to all of the modems.

10. The line interface module of claim 9, wherein each modem comprises a transformer, the transformer coupled to the R line provided by each line interface device in each line interface module, and the transformer coupled to one switch in each line interface device of each line interface module.

11. The line interface module of claim 7, wherein the line interface module is implemented as a card that plugs into a telecommunications chassis.

12. The line interface module of claim 7, wherein the modem pool comprises thirty-two modems, and wherein the line interface module has four inputs coupled to data lines and thirty-two outputs coupled to modems.

13. A method for coupling a plurality of data lines to modems in a modem pool, comprising:
    coupling each of the data lines to separate inputs of a plurality of line interface modules such that a subset of the plurality of data lines is coupled to each line interface module;
    detecting a need for service on a requesting data line;
    selecting one of the modems in response to the detected need for service on the requesting data line, where the selected modem can be any one of the modems in the modem pool; and
    directing the line interface module to which the requesting data line is coupled to couple the requesting data line to the selected modem.

14. The method of claim 13, wherein the method is implemented using cards that plug into a telecommunications chassis.

15. The method of claim 13, wherein the modem pool comprises thirty-two modems, and wherein each line interface module has four inputs coupled to data lines and thirty-two outputs coupled to modems.

16. A communication server, comprising
    at least one line interface module operable to couple each of a plurality of data lines to each of a plurality of modems; and
    a controller coupled to the line interface module and operable to detect a need for data service on one of the data lines, to select an available modem from the plurality of modems, and to direct the line interface module to couple the data line to the selected modem.

17. The communication server of claim 16, wherein the line interface module comprises a plurality of line interface devices, each line interface device operable to couple at least one of the data lines to each of the modems.

18. The communication server of claim 17, wherein each line interface device comprises:

a transformer coupled to the data line and providing a T line and a R line as outputs, the R line coupled to each of the modems; and a plurality of switches equal in number to the plurality of modems, each switch operable to couple the T line to one of the modems.

19. The communication server of claim 16, wherein the data lines are twisted pair data lines.

20. A communication server, comprising:

means for coupling each of the data lines to separate inputs of a plurality of line interface modules such that a subset of the plurality of data lines is coupled to each line interface module;

means for detecting a need for service on a requesting data line;

means for selecting one of the modems in response to the detected need for service on the requesting data line, where the selected modem can be any one of the modems in the modem pool; and means for directing the line interface module to which the requesting data line is coupled to couple the requesting data line to the selected modem.

21. The communication server of claim 20, wherein the line interface modules and modems are implemented using cards that plug into a telecommunications chassis.

22. The communication server of claim 20, wherein the modem pool comprises thirty-two modems, and wherein each line interface module has four inputs coupled to data lines and thirty-two outputs coupled to modems.

\* \* \* \* \*